US012745066B2

(12) United States Patent
Kim et al.

(10) Patent No.: US 12,745,066 B2
(45) Date of Patent: Sep. 22, 2026

(54) METHOD AND DEVICE FOR SUPPORTING NETWORK FUNCTION EXPOSURE SERVICE FOR TERMINAL

(71) Applicant: Samsung Electronics Co., Ltd., Suwon-si (KR)

(72) Inventors: Hyesung Kim, Suwon-si (KR); Sungjin Park, Suwon-si (KR); Jicheol Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 430 days.

(21) Appl. No.: 18/577,514

(22) PCT Filed: Jul. 8, 2022

(86) PCT No.: PCT/KR2022/009985

§ 371 (c)(1), (2) Date: Jan. 8, 2024

(87) PCT Pub. No.: WO2023/282705

PCT Pub. Date: Jan. 12, 2023

(65) Prior Publication Data

US 2025/0008309 A1 Jan. 2, 2025

(30) Foreign Application Priority Data

Jul. 9, 2021 (KR) ........................ 10-2021-0090340

(51) Int. Cl.

*H04W 36/14* (2009.01)
*H04W 4/50* (2018.01)
*H04W 8/24* (2009.01)

(52) U.S. Cl.

CPC ............... *H04W 4/50* (2018.02); *H04W 8/24* (2013.01)

(58) Field of Classification Search

CPC . H04W 36/1443; H04W 88/18; H04W 12/06; H04W 36/14; H04W 12/72; H04L 12/00

See application file for complete search history.

(56) References Cited

U.S. PATENT DOCUMENTS

2020/0008037 A1 1/2020 Arora et al.
2021/0014759 A1* 1/2021 Zhu ........................ H04L 67/51

(Continued)

FOREIGN PATENT DOCUMENTS

CN 112470444 A 3/2021
KR 10-2020-0131876 A 11/2020
WO 2022/005170 A1 1/2022

OTHER PUBLICATIONS

3GPP, Functional architecture and information flows to support Common API Framework for 3GPP Northbound APIs; Stage 2 (Release 17), 3GPP TS 23.222 V17.5.0, Jun. 2021.

(Continued)

*Primary Examiner* — Gary Lafontant
(74) *Attorney, Agent, or Firm* — Jefferson IP Law, LLP

(57) ABSTRACT

The present disclosure relates to a communication technique for converging IoT technology with a 5G communication system for supporting a higher data transmission rate beyond a 4G system, and a system therefor. A method for supporting a network function exposure service of a terminal, according to one embodiment of the present disclosure, may comprise the steps of: transmitting, to a network entity, a first request message including information on an application programming interface (API) invocation capability of a terminal; receiving, from the network entity, as a response to the first request message, a first response message including information on whether the API invocation is allowed; and invoking the API on the basis of the information on whether the API invocation is allowed.

20 Claims, 11 Drawing Sheets

(56) References Cited

U.S. PATENT DOCUMENTS

2021/0144550 A1* 5/2021 Ito ........................ H04W 12/069
2021/0320923 A1 10/2021 Xu
2022/0191650 A1* 6/2022 Kim ........................ H04L 67/53
2022/0191776 A1* 6/2022 Kim ........................ H04W 8/20
2022/0263832 A1* 8/2022 Gupta ................. H04L 63/0838
2022/0330128 A1 10/2022 Kim et al.
2023/0013720 A1* 1/2023 Gupta ................... H04W 88/18
2023/0062452 A1* 3/2023 Kim ...................... H04W 76/15

OTHER PUBLICATIONS

International Search Report and written opinion dated Oct. 11, 2022, issued in International Application No. PCT/KR2022/009985.
Korean Office Action dated Aug. 7, 2025, issued in Korean Application No. 10-2021-0090340.

* cited by examiner

METHOD AND DEVICE FOR SUPPORTING NETWORK FUNCTION EXPOSURE SERVICE FOR TERMINAL

CROSS-REFERENCE TO RELATED APPLICATION(S)

This application is a U.S. National Stage application under 35 U.S.C. § 371 of an International application number PCT/KR2022/009985, filed on Jul. 8, 2022, which is based on and claims the benefit of a Korean application number 10-2021-0090340, filed on Jul. 9, 2021, in the Korean Intellectual Property Office, the disclosure of which is incorporated by reference herein in its entirety.

TECHNICAL FIELD

The disclosure relates to wireless communications and, in particular, to a method and device for supporting a network function exposure service using a common application program interface (API) framework (CAPIF).

BACKGROUND ART

In order to meet the demand for wireless data traffic soring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system: beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (COMP), and interference cancellation.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

Meanwhile, the 3GPP, which is in charge of cellular mobile communication standardization, has named the new core network architecture 5G core (5GC) and standardized the same to promote the evolution from the legacy 4G LTE system to the 5G system.

5GC supports the following differentiated functions as compared to the evolved packet core (EPC), which is the legacy network core for 4G.

First, 5GC adopts the network slicing function. As a requirement of 5G, 5GC should support various types of terminals and services, e.g., enhanced mobile broadband (eMBB), ultra reliable low latency communications (URLLC), or massive machine type communications (mMTC). These UEs/services have different requirements for the core network. For example, the eMBB service requires a high data rate while the URLLC service requires high stability and low latency. Network slicing is technology proposed to meet such various requirements.

Network slicing is a method for creating multiple logical networks by virtualizing one physical network, and the network slice instances (NSIs) may have different characteristics. Therefore, various service requirements may be met by allowing each NSI to have a network function (NF) suited for its characteristics. Various 5G services may be efficiently supported by allocating an NSI meeting required service characteristics for each UE.

Second, 5GC may seamlessly support the network virtualization paradigm by separating the mobility management function and the session management function. In legacy 4G LTE, all UEs may receive services over the network through signaling exchange with a single core device called the mobility management entity (MME) in charge of registration, authentication, mobility management and session management functions. However, in 5G, the number of UEs explosively increases and mobility and traffic/session characteristics that need to be supported according to the type of UE are subdivided. Resultantly, if all functions are supported by a single device, such as MME, the scalability of adding entities for each required function may decrease. Accordingly, various functions are under development based on a structure that separates the mobility management function and the session management function to enhance the scalability in terms of function/implementation complexity of the core equipment in charge of the control plane and the signaling load.

DETAILED DESCRIPTION OF THE INVENTION

Technical Problem

The disclosure proposes a method for configuring, to a UE, relevant information necessary for a client in the UE to directly/indirectly access a network exposure service supported in a 3GPP core network.

The disclosure proposes a method for authenticating whether a network exposure service is used for a corresponding UE to configure, to the UE, relevant information necessary for directly/indirectly accessing the network exposure service supported in a 3GPP core network.

Technical Solution

A method for supporting a network function exposure service of a UE according to an embodiment of the disclosure may comprise transmitting a first request message including a serving PLMN ID to a first network entity, receiving a first response message including first information related to network function exposure of a serving PLMN corresponding to the serving PLMN ID from the first network entity, transmitting a second request message to a second network entity, wherein the second request message includes at least one of a UE ID, the serving PLMN ID, or an AC profile, receiving, from the second network entity, a second response message including second information related to network function exposure matching at least one of the serving PLMN ID or the AC profile, and invoking an API based on the first information and the second information.

A UE for supporting a network function exposure service according to an embodiment of the disclosure may comprise a transceiver and a controller controlling the transceiver to transmit a first request message including a serving PLMN ID to a first network entity, controlling the transceiver to receive a first response message including first information related to network function exposure of a serving PLMN corresponding to the serving PLMN ID from the first network entity, controlling the transceiver to transmit a second request message to a second network entity, wherein the second request message includes at least one of a UE ID, the serving PLMN ID, or an AC profile, controlling the transceiver to receive, from the second network entity, a second response message including second information related to network function exposure matching at least one of the serving PLMN ID or the AC profile, and invoking an API based on the first information and the second information.

Advantageous Effects

According to the disclosure, as the UE involves in use of a network exposure service, it is easy to reflect the service status of the client in the UE, and the UE may directly perform management on providing, to the outside, subscriber information about the UE and the UE stored in the network.

MODE FOR CARRYING OUT THE INVENTION

Figure 1:
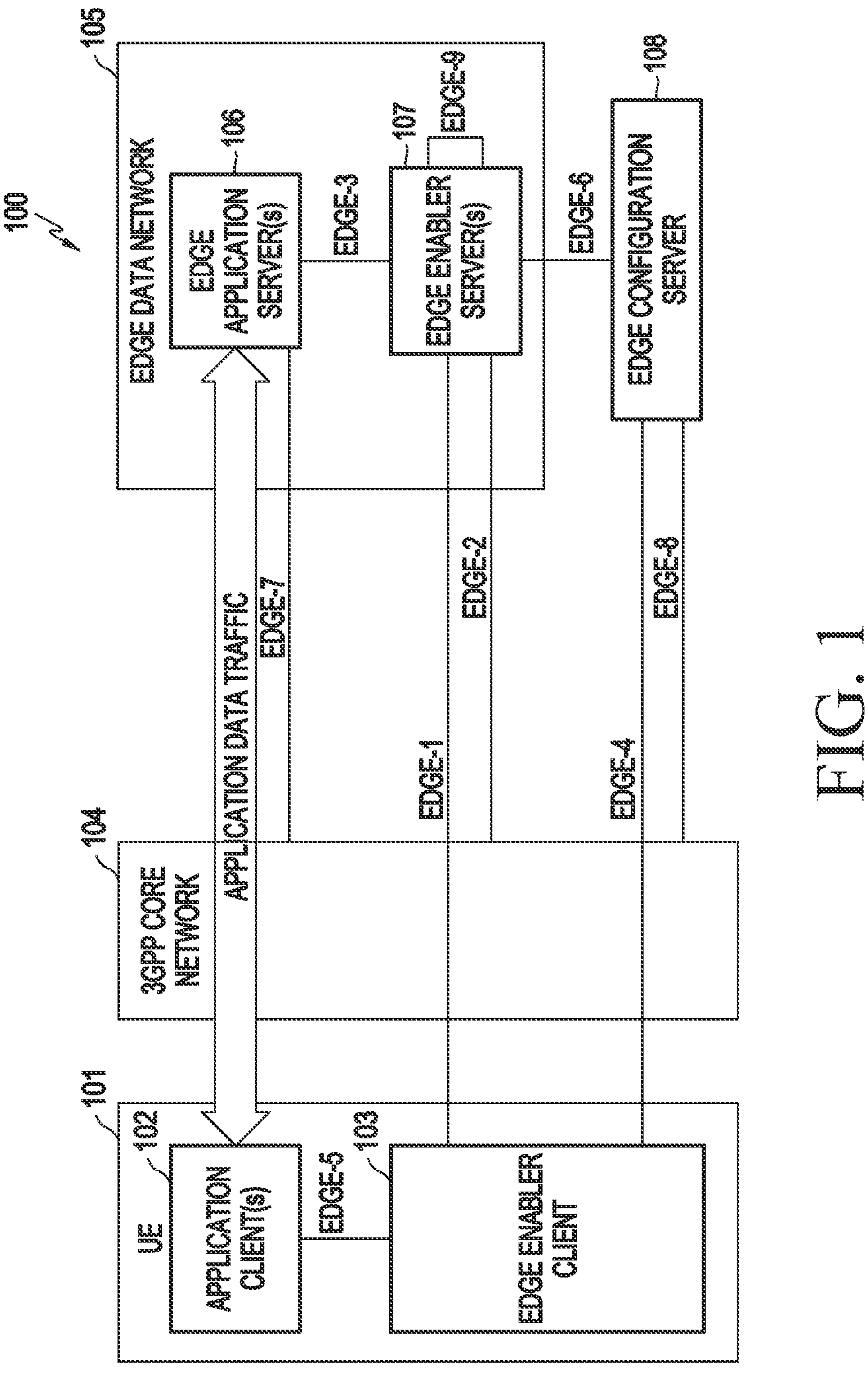
FIG. 1 is a view illustrating an application layer network architecture and an interface supporting edge computing according to an embodiment of the disclosure.

Hereinafter, embodiments of the present invention are described in detail with reference to the accompanying drawings. When determined to make the subject matter of the present invention unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure. For the same reasons, some elements may be exaggerated or schematically shown. The size of each element does not necessarily reflects the real size of the element. The same reference numeral is used to refer to the same element throughout the drawings. Advantages and features of the present disclosure, and methods for achieving the same may be understood through the embodiments to be described below taken in conjunction with the accompanying drawings. However, the present invention is not limited to the embodiments disclosed herein, and various changes may be made thereto. The embodiments disclosed herein are provided only to inform one of ordinary skilled in the art of the category of the present disclosure. The present invention is defined only by the appended claims. The same reference numeral denotes the same element throughout the specification. When determined to make the subject matter of the present invention unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

Hereinafter, the base station may be an entity allocating resource to terminal and may be at least one of eNodeB, Node B, base station (BS), radio access network (RAN), access network (AN), RAN node, wireless access unit, base station controller, or node over network. The terminal may include UE (user equipment), MS (mobile station), cellular phone, smartphone, computer, or multimedia system capable of performing communication functions. According to the present invention, downlink (DL) refers to a wireless transmission path of signal transmitted from the base station to the terminal, and uplink (UL) refers to a wireless transmission path of signal transmitted from the terminal to the base station. Further, although LTE or LTE-A system is described in connection with embodiments of the present invention, as an example, embodiments of the present invention may also apply to other communication systems with similar technical background or channel form. For example, 5G mobile communication technology (5G, new radio, NR) developed after LTE-A may be included in systems to which embodiments of the disclosure are applicable, and 5G below may be a concept including legacy LTE, LTE-A and other similar services. Further, embodiments of the present invention may be modified in such a range as not to significantly depart from the scope of the present invention under the determination by one of ordinary skill in the art and such modifications may be applicable to other communication systems. It should be appreciated that the blocks in each flowchart and combinations of the flowcharts may be performed by computer program instructions.

Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement embodiments, the functions mentioned in the blocks may occur in different orders. For example, two blocks that are consecutively shown may be performed substantially simultaneously or in a reverse order depending on corresponding functions. As used herein, the term "unit" means a software element or a hardware element such as a field-programmable gate array (FPGA) or an application specific integrated circuit (ASIC). A unit may play a certain role. However, a 'unit' is not limited to software or hardware. A 'unit' may be configured in a storage medium that may be addressed or may be configured to execute one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. Functions provided within the components and the 'units' may be combined into smaller numbers of components and 'units' or further separated into additional components and 'units'. Further, the components and 'units' may be implemented to execute one or more CPUs in a device or secure multimedia card. According to embodiments, a " . . . unit" may include one or more processors.

The terms referring to network entities and objects of an edge computing system as used herein, the terms referring to messages, and the term referring to identification information are provided as an example for ease of description. Thus, the disclosure is not limited by the terms, and such terms may be replaced with other terms denoting objects with equivalent technical concept.

Although terms and names as defined in the 5G system standard are used herein for ease of description, embodiments of the disclosure are not limited thereto or thereby, and the same may apply likewise to systems conforming to other standards.

FIG. 1 is a view illustrating an application layer network structure and an interface supporting edge computing according to an embodiment of the disclosure.

Referring to FIG. 1, a user equipment (UE) 101 may include at least one application client (AC) 102 and an edge enabler client (EEC) 103. The application client 102 may be an application-level client for providing to the user when an edge computing service is provided.

Further, the UE 101 may include a communication processor (CP) (not shown) for communicating with another wireless communication network, e.g., at least one or more mobile communication networks.

The 3GPP network 104 is illustrated as a representative of mobile communication networks, and may include, e.g., an EPC and/or a 5GC. The 3GPP network 104 may include base stations that communicate directly with the UE 101 over-the-air (OTA) and may include a higher core network configuration. When the 3GPP network includes a 5GC, it may include an access and mobility management function (AMF), a session management function (SMF), a policy control function (PCF), and a user plane function (UPF).

Further, when having an EPC as a core network (CN), it may include network nodes corresponding to the 5GC.

Edge data networks may be implemented through a network slicing technique, and all edge data networks may be configured in the same form. A configuration of one edge data network 105 is described as an example, which may include an edge hosting platform and may include an edge enabler server (EES) 107, one or more edge application servers (EASs) 106, and an orchestrator for the edge hosting platform. The edge enabler server 106 may include an edge enabler client manager, an edge enabler platform, and an edge enabler API server.

Network functions may be defined as follows, some of which are illustrated in FIG.

3GPP network 104: may include a 3GPP radio access network (RAN) and a core network.

One or more edge data networks 105: are data networks of 5G core network or packet data networks of EPC network and may be data networks including functions for providing an edge computing service, such as an edge hosting platform edge enabler server.

One or more application clients (ACs) 102: An application program running on the mobile operating system of the UE 101 and may be identified by an application identifier on the 5G core network. In an environment providing a mobile operating system, the AC may be identified by the operating system (OS) identifier and the unique application identifier (OSAppID) unique for each OS.

One or more edge application servers or edge applications (EASs) 106: Application server programs running on a virtualization container or a virtual machine (VM) image operated on an edge hosting environment and may be server programs executed as the VM image is instantiated and may be called edge applications.

Edge configuration server (ECS) 108: A server providing configuration information about the edge data network 105 to the UE 101 and may be an initial access server that may receive configuration information for the UE 101 to use a mobile edge computing (MEC) service.

Edge hosting platform: may be platform software including a virtualization layer that may execute a plurality of edge application programs. In the disclosure, the edge hosting platform may be used in the same concept as the edge hosting environment.

Orchestrator for edge hosting platform: may be a management system that manages the lifecycle for edge application programs running on the edge hosting platform and manages the edge hosting platform. It may perform the function of the orchestrator defined in the European telecommunication: standards institute management and network operation (ETSI MANO).

Edge enabler server (EES) 107: A server for providing an edge computing service and may be a server that provides the UE 101 with a list of application programs available on the edge hosting platform (edge enabler client manager), manages configuration information about the edge application programs operated on the edge computing hosting platform, and provides an application programming interface (API) for the function provided from the 3GPP network to the edge application programs.

Edge enabler client (EEC) 103: A software module of the UE 101 and may be a software agent having functions for providing an edge computing service. The EEC 103 may perform an authentication function for accessing the edge computing server, a function for obtaining access information about the EES 107 and the edge data network 105 in conjunction with the ECS 108, a function for obtaining information about one or more EASs 106 from the EES 107, and a function for routing traffic of one or more ACs 102 in the UE to one or more EASs 106 based on information about one or more EASs 106.

The application network architecture for supporting edge computing as shown in FIG. 1 may be managed by a separate edge computing service provider from the mobile communication service provider, and there may be a plurality of separate edge computing service providers in one mobile communication service provider network. The application layer network architecture for supporting edge computing as shown in FIG. 1 may support the service provider's configuration.

The application layer network architecture shown in FIG. 1 may support a plurality of edge computing service providers in one mobile communication network. The application layer network architecture may transfer a plurality of edge computing service providers available in one mobile communication network and configuration information for accessing the edge computing network installed by the service provider to the UE.

The application layer network architecture shown in FIG. 1 may transfer an edge network service provider selected by the mobile communication service provider among the plurality of edge computing service providers present in one mobile communication network and configuration information for accessing the edge computing network installed by the selected edge network service provider to the UE.

Figure 2:
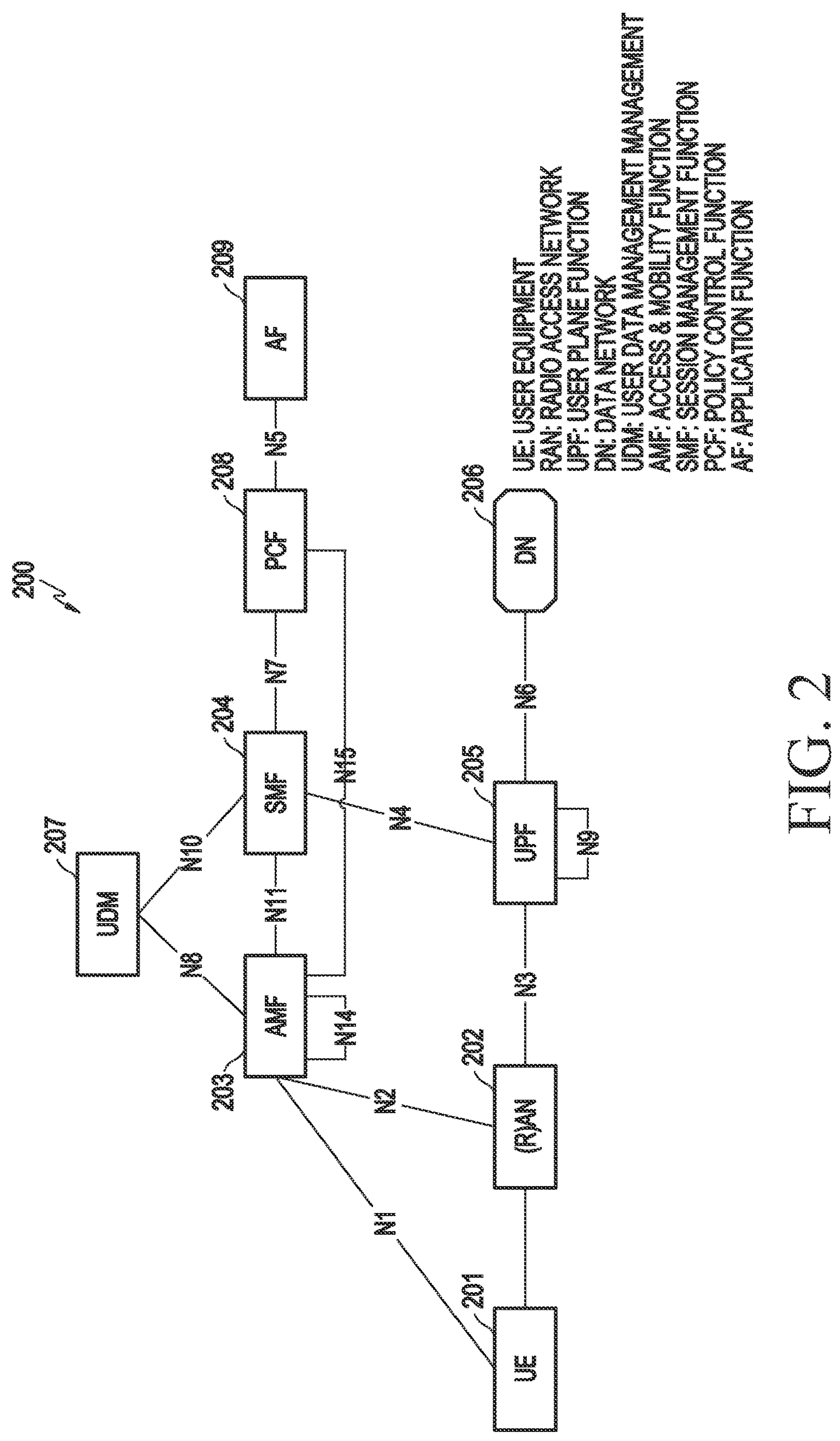
FIG. 2 is a view illustrating a network architecture and interface of a 5G system according to an embodiment of the disclosure.

FIG. 2 is a view illustrating a network architecture and interface of a 5G system according to an embodiment of the disclosure. The network entity included in the network architecture of the 5G system of FIG. 2 may include a network function (NF) according to system implementation.

Referring to FIG. 2, the network structure of the 5G system 200 may include various network entities. As an example, the 5G system 200 may include an (core) access and mobility management function (AMF) 203, a session management function (SMF) 204, a policy control function (PCF) 208, an application function (AF) 209, a unified data management (UDM) 207, a data network (DN) 206, a user plane function (UPF) 205, a (radio) access network ((R)AN) 202, and a UE, i.e., the user equipment (UE) 201.

Each NF of the 5G system 200 supports the following functions.

The AMF 203 provides functions for per-UE access and mobility management and may connect basically to one AMF per UE. Specifically, the AMF 203 supports such functions as inter-CN node signaling for mobility between 3GPP access networks, radio access network (RAN) CP interface (i.e., N2 interface) termination, NAS signaling termination (N1), NAS signaling security (NAS ciphering) and integrity protection, AS security control, registration management (registration area management), connectivity management, idle mode UE reachability (including controlling and performing paging retransmission), mobility management control (subscription and policy), intra-system mobility and inter-system mobility support, support of network slicing, SMF selection, lawful intercept (for interface to AMF event and LI system), transfer of session management (SM) messages between UE and SMF, transparent proxy for SM message routing, access authentication, access authorization including a roaming authority check, transfer of SMS messages between UE and SMSF, security anchor function (SEA), and security context management (SCM). All or some of the functions of the AMF 103 may be supported in a single instance of one AMF.

The DN 206 means, e.g., an operator service, Internet access, or a third party service. The DN 206 transmits a downlink protocol data unit (PDU) to the UPF 205 or receives a PDU transmitted from UE 201 from UPF 205.

The PCF 208 receives information about packet flow from application server and provides the function of determining the policy such as mobility management or session management. Specifically, the PCF 208 supports functions such as support of a singlized policy framework for controlling network operations, providing a policy rule to allow CP function(s) (e.g., AMF or SMF) to execute a policy rule, and implementation of a front end for accessing subscription information related to policy decision in the user data repository (UDR).

The SMF 204 provides session management function and, if UE has multiple sessions, this may be managed per session by a different SMF. Specifically, the SMF 204 supports such functions as session management (e.g., session establishment, modification, and release including maintaining tunnel between the UPF 205 and the (R)AN 202 node), UE IP address allocation and management (optionally including authentication), selection and control of a UP function, traffic steering settings for routing traffic to a proper destination in UPF 205, interface termination towards policy control functions, execution of control part of policy and QoS, lawful intercept (for interface to SM event and LI system), termination of SM part of NAS message, downlink data notification, AN-specific SM information publisher (transferred via the AMF 203 and N2 to the (R)AN 202), SSC mode decision of session, and roaming function. All or some of the functions of the SMF 204 may be supported in a single instance of one SMF.

The UDM 207 stores, e.g., user's subscription data, policy data. The UDM 207 includes two parts, i.e., application front end (FE) (not shown) and user data repository (UDR) (not shown).

The UPF 205 transfers the downlink PDU, received from the DN 206, to the UE 201 via the (R)AN 202 and transfers the PDU, received from the UE 201 via the (R)AN 202, to the DN 206. Specifically, the UPF 205 supports such functions as anchor point for intra/inter RAT mobility, external PDU session point of interconnection to data network, packet routing and forwarding, packet inspection and user plane part of policy rule, lawful intercept, traffic usage reporting, uplink classifier for supporting routing of traffic flow to data network, branching point for supporting multi-home PDU session, QoS handling (e.g., packet filtering, gating, uplink/downlink rate execution) for user plane, uplink traffic verification (SDF mapping between service data flow (SDF) and QoS flow), transport level packet marking in uplink and downlink, downlink packet buffering, and downlink data notification triggering. All or some of the functions of the UPF 205 may be supported in a single instance of one UPF.

The AF 209 interacts with 3GPP core network for providing services (e.g., supporting such functions as application influence on traffic routing, network capability exposure approach, and interactions with policy framework for policy control).

The (R)AN 202 collectively refers to new radio access technologies that support both E-UTRA (evolved E-UTRA) which is an evolution from 4G radio access technology and new radio access technology (NR: New Radio) (e.g., gNB).

gNB supports such functions as functions for radio resource management (i.e., radio bearer control, radio admission control, connection mobility control, dynamic allocation of resources (i.e., scheduling) to UE on uplink/downlink), internet protocol (IP) header compression, encryption and integrity protection of user data stream, where routing to AMF is not determined from information provided to UE, selection of an AMF when UE attaches, routing of user plane data to UPF(s), routing of control plane information to AMF, connection setup and release, scheduling and transmission (generated from AMF) of paging message, scheduling and transmission (generated from AMF or operating and maintenance (O&M)) of system broadcast information, measurement and measurement reporting configuration for mobility and scheduling, transport level packet marking on uplink, session management, support of network slicing, QoS flow management and mapping to data radio bearer, support of UE in inactive mode, distribution of NAS messages, NAS node selection, radio access network sharing, dual connectivity, and tight interoperation between NR and E-UTRA.

UE 201 means a user device. The user device may be referred to as a terminal, mobile equipment (ME), or mobile station (MS). Further, the user device may be a portable device, such as a laptop computer, mobile phone, personal digital assistant (PDA), smartphone, or multimedia device or may be a non-portable device, e.g., a personal computer (PC) or vehicle-mounted device.

Meanwhile, although FIG. 2 illustrates an example reference model in which the UE 201 accesses one DN 110 using one PDU session for ease of description, the disclosure is not limited thereto.

The UE 201 may simultaneously access two data networks (i.e., local and central) using multiple PDU sessions. In this case, two SMFs may be selected for different PDU sessions. However, each SMF may have the capability of controlling both the local and central UPFs in the PDU session.

Further, the UE 201 may simultaneously access two (i.e., local and central) data networks provided in a single PDU session.

In the 3GPP system, a conceptual link connecting NFs in the 5G system is defined as a reference point. As an example, reference point(s) included in the 5G system 200 of FIG. 2 are as follows.

N1: the reference point between the UE 201 and the AMF 203

N2: the reference point between N2, (R)AN 202, and AMF 203

N3: the reference point between N2, (R)AN 202, and UPF 205

N4: the reference point between the SMF 204 and the UPF 205

N5: the reference point between the PCF 208 and the AF 209

N6: the reference point between the UPF 205 and the DN 206

N7: the reference point between the SMF 204 and the PCF 208

N8: the reference point between the UDM 207 and the AMF 203

N9: the reference point between two core UPFs 205

N10: the reference point between the UDM 207 and the SMF 204

N11: the reference point between the AMF 203 and the SMF 204

N14: the reference point between two AMFs 203

Figure 3:
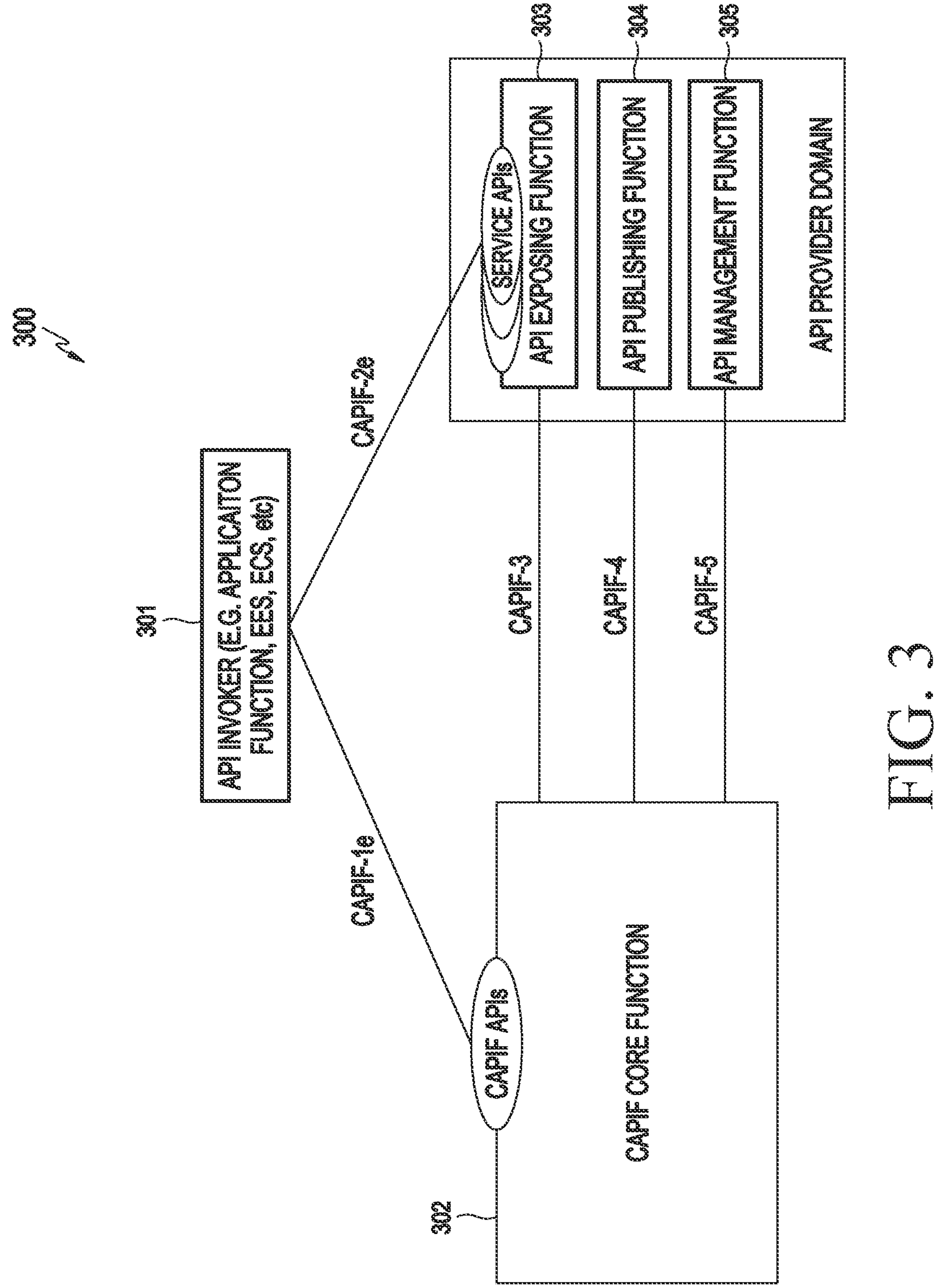
FIG. 3 is a view illustrating a structure of a common application program interface framework according to an embodiment of the disclosure.

N15: the reference point between PCF and AMF in non-roaming scenario and reference point between PCF in visited network and AMF in roaming scenario FIG. 3 is a view illustrating a structure of a common application program interface framework according to an embodiment of the disclosure.

Referring to FIG. 3, a common application program interface (API) framework (CAPIF) 300 includes at least one API invoker 301, a CAPIF core function (CCF) 302, an API exposing function (AEF) 303, an API publishing function 304, and an API management function 305. The at least one API invoker 301 may generally be a server provided by a third-party application provider that has signed a service contract with a public land mobile network (PLMN) operator, and is an entity that invokes and uses the service API. For example, at least one API invoker 301 may include an EES, an EAS, or an ECS. According to an embodiment, the at least one API invoker 301 may obtain information about a service API to be used from the CCF 302. The CCF 302 is a functional entity that may be configured to accumulate all common aspects of the service API. The CCF 302 may be configured for authentication, monitoring, logging authorization, and discovery common to all service APIs. According to an embodiment, the CCF 302 may store information about the service API and publish the stored information, thereby providing the API invoker 301 with an information discovery service for the service API. The information about the service API may include information about a communication entry point for invoking the service API and information about the AEF 303. The AEF 303 is a functional entity that may be configured to supply one or more service APIs to at least one API invoker 301. According to an embodiment, the API invoker 301 may be directly connected to the AEF 303 to invoke the service API. According to an embodiment, the API invoker 301 may not be directly connected to the API publishing function 304 and the API management function unit 305. The API publishing function 304 may be configured to publish a library of the service API onto the CCF 302. According to an embodiment, using the API publishing function 304, the API provider may register and post information about the service API in the CCF 302 so that the at least one API invoker 301 may search for the service API. In the API management function 305, the API provider may monitor the service API and log and audit the service API invoke log. The CAPIF 300 includes one or more interface/reference points. One or more interfaces include CAPIF-1 (not shown), CAPIF-1e, CAPIF-2 (not shown), CAPIF-2e, CAPIF-3, CAPIF-4, and CAPIF-5 interfaces. For example, the CAPIF-1e and CAPIF-2e interfaces exist between the CCF 302 and the AEF 303 access point for the at least one API invoker 301 (present outside the PLMN trust domain). According to an embodiment, the one or more interfaces are defined in the 3rd generation partnership project (3GPP) TS 23.222 standard, and the CAPIF 300 function is defined in the 3GPP TS 23.222 standard. According to an embodiment, security for CAPIF-1, CAPIF-2, CAPIF-3, CAPIF-4, and CAPIF-5 interfaces may support transport layer security (TLS) as defined in the 3GPP TS 23.222 standard.

Hereinafter, a method in which a client (e.g., an EEC or an application client) in a UE may operate as an API invoker and a method in which a client in a UE may initiate a procedure performed by an existing API invoker with a CCF or an AEF according to various embodiments of the disclosure are described.

Figure 4:
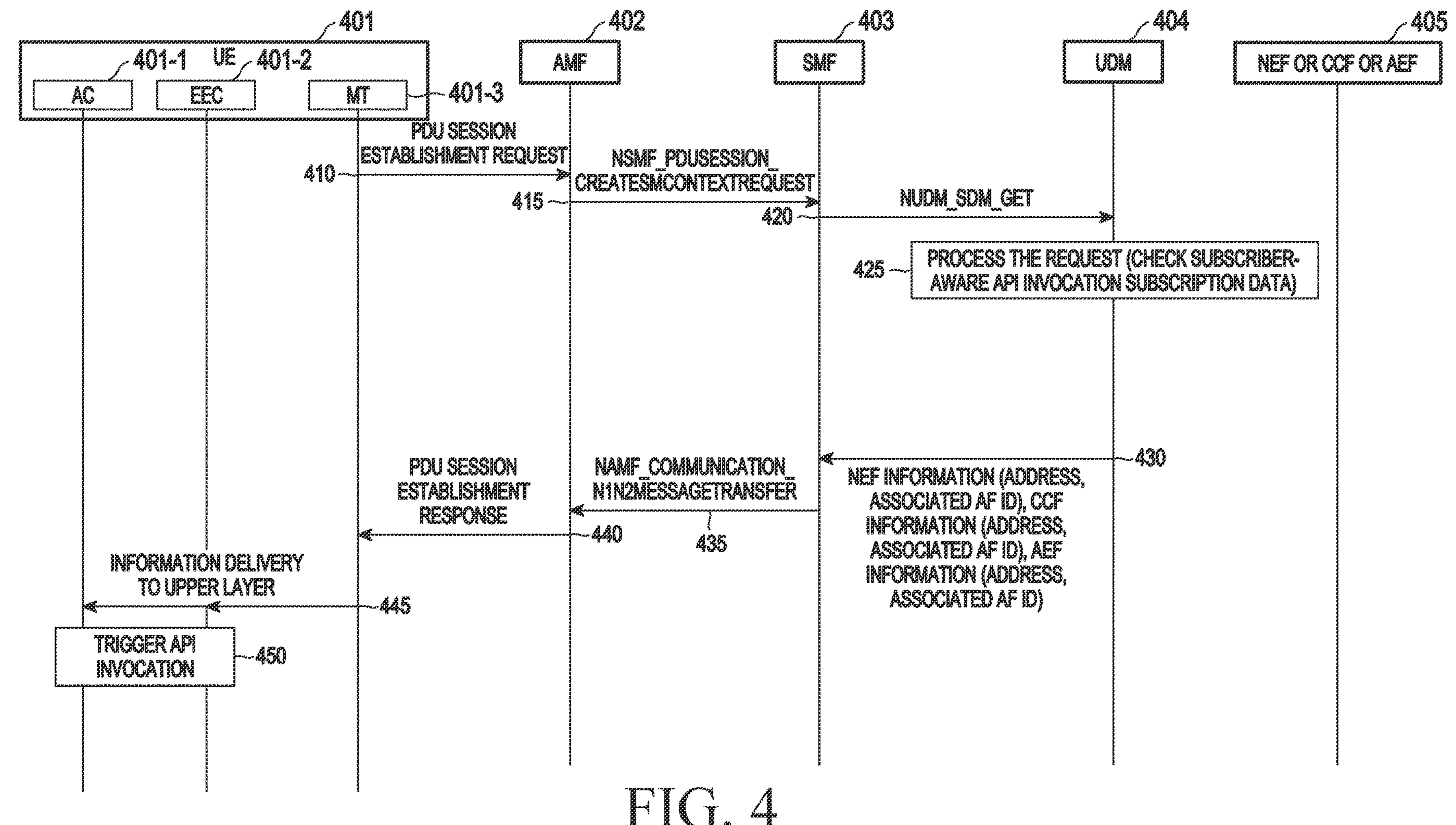
FIG. 4 is a view illustrating a procedure for transferring configuration information necessary for using a network function exposure service to a UE according to an embodiment of the disclosure.

FIG. 4 is a view illustrating a procedure for transferring configuration information necessary for using a network function exposure service to a UE according to an embodiment of the disclosure.

Referring to FIG. 4, in step 410, the UE 401 transmits a PDU session establishment request message to the AMF 402. The PDU session establishment request message transmitted from the UE 401 to the AMF 402 may include information about API invocation capability related to network exposure or network capability exposure of the UE 401. The information about the API invocation capability may include at least one of information about whether a dedicated client performing API invocation is installed in the UE 401, information about the client type, or information about whether a modem in the UE 401 is interoperable with the corresponding client.

Referring to FIG. 4, in step 410, the UE 401 transmits a PDU session establishment request message to the AMF 402. The PDU session establishment request message transmitted from the UE 401 to the AMF 402 may include information about API invocation capability related to network exposure or network capability exposure of the UE 401. The information about the API invocation capability may include, in addition to an indicator simply indicating that there is API invocation capability, at least one of information about whether a dedicated client 401-2 performing API invocation is installed in the UE 401, information about the client type, or information about whether a modem 401-3 in the UE 401 is interoperable with the corresponding client. Further, the PDU session establishment request message transmitted from the UE 401 to the AMF 402 may further include user consent for the UE subscriber to share the UE-related information to the outside in the 3GPP network. In this case, the user consent may be limited to consent to sharing information related to the use of the service received through the session to the outside. Additionally, the user consent may include a specification of information that may be shared externally in the 3GPP network for each available service.

According to an embodiment, the dedicated client 401-2 performing the API invocation may include a network exposure client (NEC) for interoperating with the network exposure function (NEF) 405, a CAPIF client for interoperating with the CCF 405, and an edge enabler client (EEC) when the UE 401 supports interoperating with the edge computing system. At least one client among the NEC, the CAPIF client, or the EEC may be installed in the UE, and the NEC, the CAPIF client, and the EEC may interoperate with each other. For example, the EDGE-5 interface provided by the EEC may be connected to the NEC or CAPIF client.

In step 415, the AMF 402 transmits the PDU session establishment request message received from the UE 401 to the SMF 403. For example, the AMF 402 may transfer the PDU session establishment request message received from the UE 401 to the SMF 403 in the form of the Nsmf_PDU session_CreateSMContextRequest message defined in the 3GPP TS 23.502 standard, including information about the API invocation capability related to network function exposure of the UE 401.

In step 420, the SMF 403 receiving the PDU session establishment request message from the AMF 402 requests the UE subscriber-related information from the UDM 404. For example, the SMF 403 may include information about the API invocation capability related to network function exposure of the UE 401 in the Nudm SDM Get message defined in the 3GPP TS 23.502 standard and transmit the information to the UDM 404 to request the information related to the UE subscriber.

In step 425, when the information about the API invocation capability related to the network function exposure of the corresponding UE received from the SMF 403 is included, the UDM 404 receiving the request for the UE subscriber-related information from the SMF 403 identifies whether the API invocation capability related to the network function exposure service is present for the corresponding UE subscriber. For example, the UDM 404 may identify whether the API invocation authority related to the network function exposure service is present for the corresponding UE subscriber through the API invocation subscriber information set in the UDM 404. The API invocation subscriber information may include an API invokable service list and invocation endpoint address information (e.g., fully qualified domain name (FQDN), uniform resource identifier (URI) information, IP address, or the like) for the corresponding UE subscriber. According to an embodiment, when the API invocation capability information related to network function exposure of the UE includes information (ID or type) about the client performing API invocation installed in the UE, the UDM 404 may select information about the service API invokable by the corresponding client. According to an embodiment, when the UDM 404 does not receive the information about the API invocation capability related to the network function exposure of the UE from the SMF 403, the UDM 404 determines whether to provide the SMF 403 with the information related to whether to allow the API invocation related to the network function exposure service accessible by the UE subscriber according to the operator policy configured in the UDM 404.

In step 430, the UDM 404 provides the SMF 403 with information related to whether to allow the API invocation related to the network function exposure service accessible by the corresponding UE subscriber. The information related to whether to allow the API invocation related to the network function exposure service accessible by the corresponding UE subscriber provided by the UDM 404 to the SMF 403 may include at least one of the following information.

- NEF information: NEF ID, NEF endpoint address, NEF service area information, list of service APIs invokable through the NEF, application function (AF) information (e.g., application ID, application function ID, endpoint address, application client ID, etc.) interoperable with the NEF, application service information (e.g., application service name or application provider information) interoperable with the NEF, edge computing service provider information, or information (e.g., direct API invocation or indirect API invocation) about the invocation method allowed for the API provided by the NEF
- CCF information CCF ID, CCF endpoint address, CCF service area information (e.g., tracking area (TA), geolocation code (GLC), data network access identifier (DNAI), etc.), data network name or network slice information (single-network slice selection assistance information (S-NSSAI)) required to generate a PDU session for accessing CCF, CCF provider information (e.g., provider ID), list of service APIs invokable through the CCF, information about the invocation method (e.g., direct API invocation or indirect API invocation) allowed for the API provided by the CCF, information about whether topology hiding is supported for the service API, or serviceable PLMN ID list provided by the CCF AEF information AEF ID, AEF endpoint address, AEF service area information (e.g., TA, GLC, or DNAI), invokable service API list, application function information (e.g., application ID, application function ID, endpoint address, application client ID, etc.) interoperable with the corresponding AEF, application service information (e.g., application service name or application provider information) interoperable with the corresponding AEF, data network name or network slice information required to generate a PDU session for accessing the AEF, edge computing service provider information interoperable with the AEF, information about the invocation method (e.g., direct API invocation or indirect API invocation) allowed for the API provided by the AEF, information about whether topology hiking is supported for the service API, or serviceable PLMN ID list provided by the AEF In step 435, the SMF 403 transfers, to the AMF 402, information (e.g., NEF information, CCF information, or AEF information) related to whether to allow API invocation related to the network function exposure service accessible by the corresponding UE subscriber, which is provided from the UDM 404, to the UE 401. For example, the SMF 403 may transfer, to the AMF 402, information related to whether to allow API invocation related to the network function exposure service accessible by the corresponding UE subscriber provided from the UDM 404 using the Namf Communication_NIN2MessageTransfer service defined in the 3GPP TS 23.502 standard.

In step 440, the AMF 402 transfers, to the UE 401, information (e.g., NEF information, CCF information, or AEF information) related to whether to allow API invocation related to the network function exposure service accessible by the corresponding UE subscriber, which is provided from the SMF 403. For example, the SMF 403 may include the information provided from the SMF 403 in the protocol configuration option of the response message to the PDU session establishment request message of step 410 and may transfer the information to the UE 401.

In step 445, the modem 401-3 in the UE 401 transfers information (e.g., NEF information, CCF information, or AEF information) related to whether to allow API invocation related to the network function exposure service accessible by the corresponding UE subscriber, which is provided from the AMF 402, to an higher layer application client (AC) 401-1 and/or a dedicated client (e.g., an EEC, a CAPIF client, or an NEC) 401-2.

In step 450, the dedicated client 401-2 and/or the application client 401-1 in the UE 401 may invoke the network function exposure service API using the received information (e.g., NEF information, CCF information, or AEF information) related to whether to allow API invocation related to the network function exposure service accessible by the corresponding UE subscriber.

In FIG. 4, an embodiment in which the UE 401 receives configuration information necessary for using a network function exposure service while performing a PDU session establishment procedure has been described, but the scope of the disclosure may include an embodiment of transferring, to the UE via the SMF, information related to whether to allow API invocation related to the network function exposure service accessible by the UE subscriber described in connection with FIG. 3 from the UDM while the UE or network performs a PDU session modification procedure disclosed.

Figure 5:
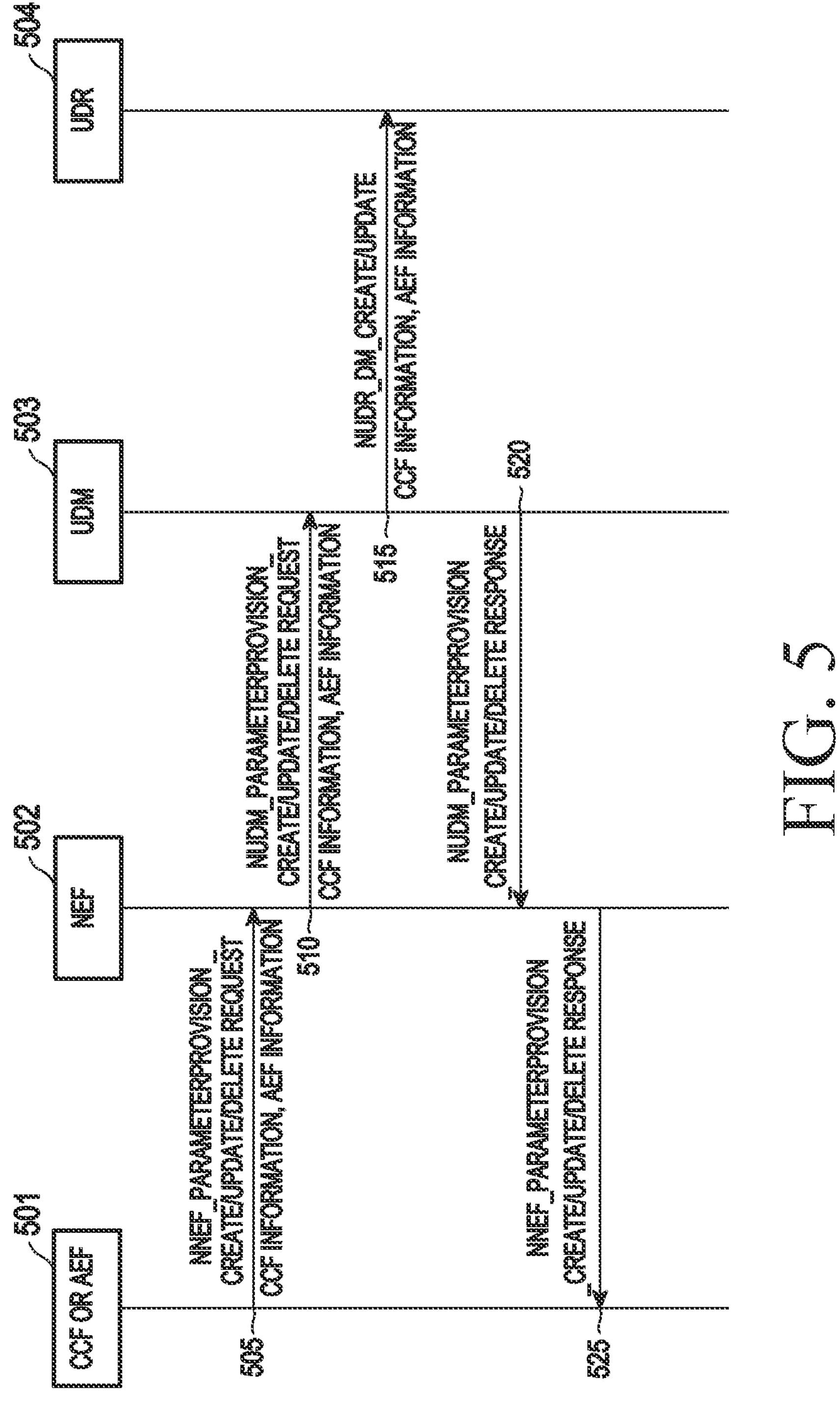
FIG. 5 is a view illustrating a procedure for configuring network function exposure service-related information to a UDM according to an embodiment of the disclosure.

FIG. 5 is a view illustrating a procedure for configuring network function exposure service-related information to a UDM according to an embodiment of the disclosure.

Referring to FIG. 5, in step 505, the CCF or AEF 501, as an AF, provides CCF information or AEF information to the NEF 502. For example, the CCF or the AEF 501 may provide CCF information or AEF information through the Nnef_ParameterProvision_Create/Update/Delete request message defined in the 3GPP TS 23.502 standard. The CCF information or the AEF information may include at least one of the following information.

CCF information CCF ID, CCF endpoint address, CCF service area information (e.g., TA, GLC, or DNAI, etc.), data network name or network slice information required to generate a PDU session for accessing CCF, CCF provider information (e.g., provider ID), information about the invocation method (e.g., direct API invocation or indirect API invocation) allowed for the service API provided by the CCF, information about whether topology hiding is supported for the service API, or serviceable PLMN ID list provided by the CCF AEF information: AEF ID, AEF endpoint address, AEF service area information (e.g., TA, GLC, or DNAI), invokable service API list, application function information (e.g., application ID, application function ID, endpoint address, application client ID, etc.) interoperable with the corresponding AEF, application service information (e.g., application service name or application provider information) interoperable with the corresponding AEF, data network name or network slice information required to generate a PDU session for accessing the CCF, edge computing service provider information interoperable with the AEF, information about the invocation method (e.g., direct API invocation or indirect API invocation) allowed for the API provided by the AEF, information about whether topology hiking is supported for the service API, or serviceable PLMN ID list provided by the AEF According to an embodiment, the CCF information or the AEF information may be provided together with the UE ID and/or the UE group ID. When provided together with the UE (group) ID, the UDM 502 adds CCF information or AEF information to subscriber information about the UE corresponding to the corresponding ID.

In step 510, the NEF 502 transfers the CCF information or the AEF information provided from the CCF or the AEF 501 to the UDM 503. For example, the NEF 502 may include the CCF information or the AEF information in the Nudm_ParameterProvision_Create/Update/Delete request message defined in the 3GPP TS 23.502 standard and transfer the same to the UDM 503.

In step 515, the UDM 503 may store the CCF information or the AEF information received from the NEF 502 in the UDM 503 and may additionally store the same in the UDR 504. For example, the UDM 503 may transfer the CCF information or the AEF information to the UDR 504 through the Nudr_DM_Create/Update service operation defined in the 3GPP TS 23.502 standard, and the UDR 504 may store the CCF information or the AEF information. According to an embodiment, the UDM 503 may determine (i.e., determine the type of subscriber information) what type of subscriber information to store the CCF information or the AEF information received from the NEF 502 in, according to the type of core network function (e.g., access and mobility management, session management, or the like) related to the service API provided by the CCF or the AEF 501. For example, when the service API provided by the CCF or the AEF 501 is related to quality of service (QoS) control of a session, the corresponding CCF information or AEF information may be stored in session management subscriber information about the UE.

In step 520, the UDM 503 reports to the NEF 502 that the CCF information or the AEF information is successfully configured. For example, the UDM 503 may transmit the Nudm_ParameterProvision_Create/Update/Delete response message defined in the 3GPP TS 23.502 standard to the NEF 502 in response to the Nudm_ParameterProvision_Create/Update/Delete request message of step 510 to inform that the CCF information or the AEF information is successfully configured in the UDM 503.

In step 525, the NEF 502 reports to the CCF or the AEF 501 whether the configuration of the CFF information or the AEF information in the UDM 503 received from the UDM 503 is successful. For example, the NEF 502 may transmit the Nnef_ParameterProvision_Create/Update/Delete response message defined in the 3GPP TS 23.502 standard in response to the Nnef_ParameterProvision_Create/Update/Delete request message of step 505 to inform whether the configuration of the CCF information or the AEF information in the UDM 503 is successful.

Through other routes than the method of configuring the CCF information and/or the AEF information in the 5G core network in an online manner as described in the embodiment of FIG. 5, the corresponding information may be stored in the UDM. For example, the local configuration may be made in the UDM in an offline manner according to a service level agreement between the operator and the CCF or AEF provider.

Figure 6:
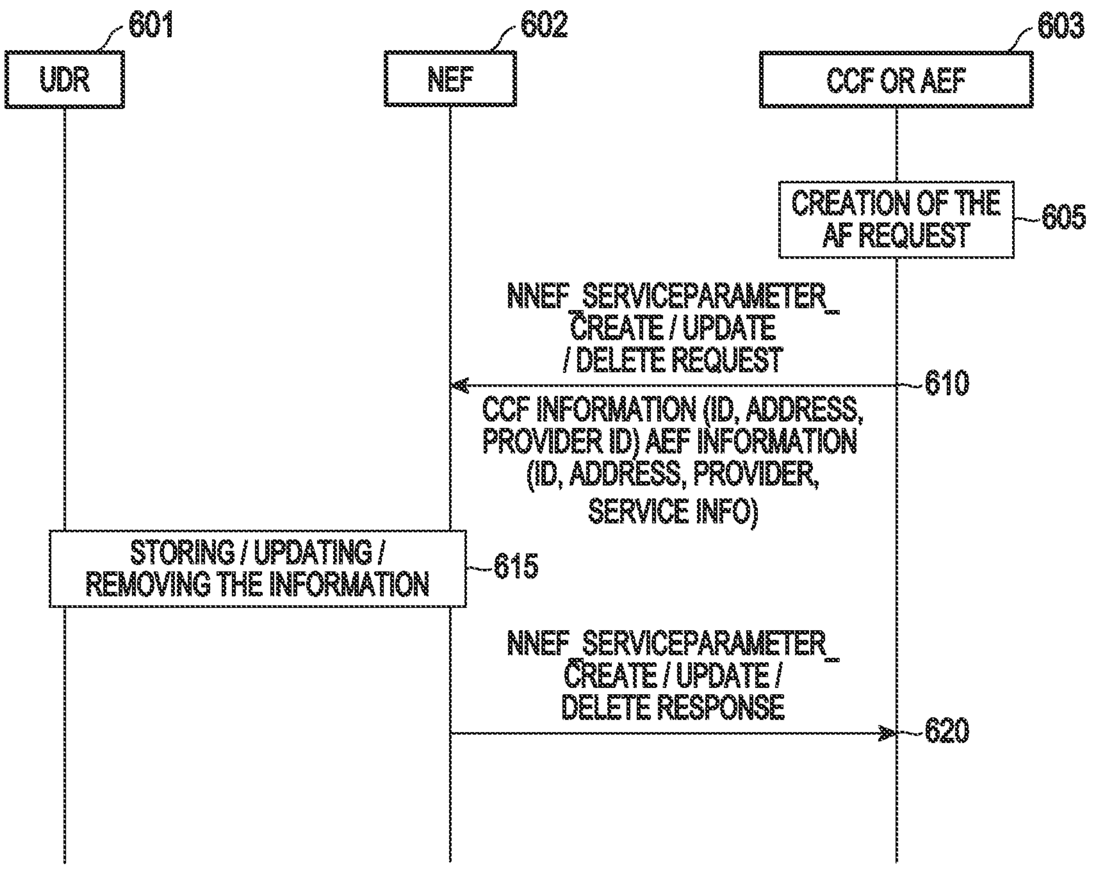
FIG. 6 is a view illustrating a procedure for configuring network function exposure service-related information to a UDR according to an embodiment of the disclosure.

FIG. 6 is a view illustrating a procedure for configuring network function exposure service-related information to a UDR according to an embodiment of the disclosure.

Referring to FIG. 6, in step 605, the CCF or AEF 603, as an AF, generates an AF request message including CCF information or AEF information. For example, the CCF or the AEF 603 may generate the AF request message through the Nnef_ServiceParameter_Create/Update/Delete service operation defined in the 3GPP TS 23.502 standard. The CCF information or the AEF information may include at least one of the following information.

- CCF information: CCF ID, CCF endpoint address, CCF service area (e.g., TA, GLC, or DNAI, etc.), data network name or network slice information required to generate a PDU session for accessing CCF, CCF provider information (e.g., provider ID), information about the invocation method (e.g., direct API invocation or indirect API invocation) allowed for the service API provided by the CCF, information about whether topology hiding is supported for the service API, or serviceable PLMN ID list provided by the CCF
- AEF information: AEF ID, AEF endpoint address, AEF service area (e.g., TA, GLC, or DNAI), invokable service API list, application function information (e.g., application ID, application function ID, endpoint address, application client ID, etc.) interoperable with the corresponding AEF, application service information (e.g., application service name or application provider information) interoperable with the corresponding AEF, data network name or network slice information required to generate a PDU session for accessing the CCF, edge computing service provider information interoperable with the AEF, information about the invocation method (e.g., direct API invocation or indirect API invocation) allowed for the API provided by the AEF, information about whether topology hiking is supported for the service API, or serviceable PLMN ID list provided by the AEF According to an embodiment, the CCF information or the AEF information may be provided together with the UE ID and/or the UE group ID. When provided together with the UE (group) ID, the UDM adds CCF information or AEF information to subscriber information about the UE corresponding to the corresponding ID.

In step 610, the CCF or AEF 603 provides the NEF 602 with the CCF information or AEF information generated in step 605. For example, the CCF or the AEF 603 may provide CCF information or AEF information through the Nnef_ServiceParameter_Create/Update/Delete request message defined in the 3GPP TS 23.502 standard.

In step 615, the NEF 602 transfers the CCF information or the AEF information received from the CCF or the AEF 603 to the UDR 601, and the UDR 601 stores the CCF information or the AEF information received from the NEF 602. According to an embodiment, the UDR 501 may determine (i.e., determine the type of subscriber information) what type of subscriber information to store the CCF information or the AEF information received from the NEF 502 in, according to the type of core network function (e.g., access and mobility management, session management, or the like) related to the service API provided by the CCF or the AEF 603. For example, when the service API provided by the CCF or the AEF 603 is related to quality of service (QoS) control of a session, the corresponding CCF information or AEF information may be stored in session management subscriber information about the UE. According to an embodiment, the UDR 601 may report whether the storage of the CCF information or the AEF information is successful to the NEF 602. For example, when the service API invocation is not allowed for the corresponding UE, the UDR 601 may inform the NEF 602 that the storage of the CCF information or the AEF information has failed. According to an embodiment, the UDR 601 may autonomously be aware whether the service API invocation for the UE is allowed, or the UDR 601 may request the UDM to identify whether the service API invocation for the UE is allowed.

In step 620, the NEF 602 reports to the CCF or the AEF 603 whether the storage of the CFF information or the AEF information in the UDR 601 received from the UDR 601 is successful. For example, the NEF 602 may transmit the Nnef_ServiceParameter_Create/Update/Delete response message defined in the 3GPP TS 23.502 standard in response to the Nnef_ServiceParameter_Create/Update/Delete request message of step 610 to inform whether the storage of the CCF information or the AEF information in the UDR 601 is successful.

Figure 7:
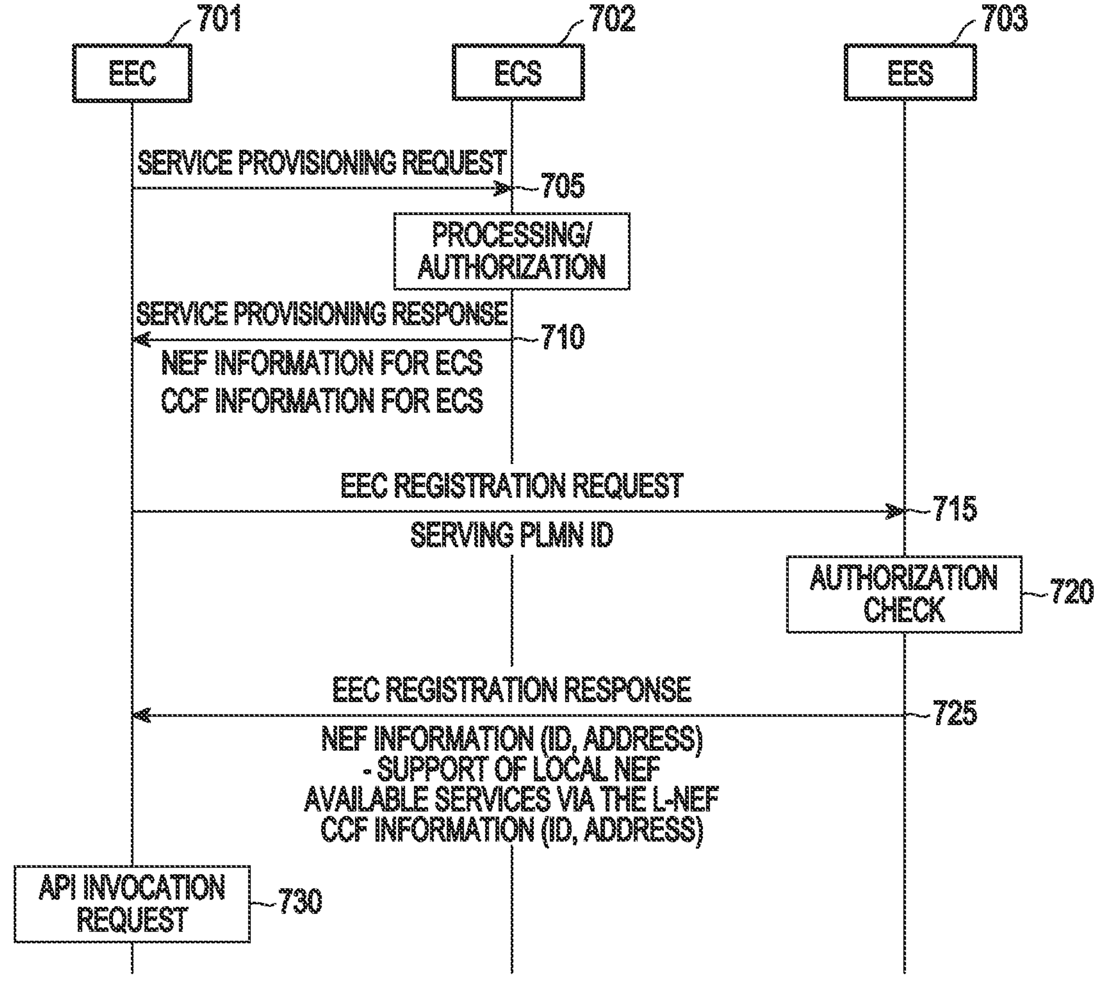
FIG. 7 is a view illustrating a procedure for transferring network function exposure service-related information through an edge enabler layer according to an embodiment of the disclosure.

FIG. 7 is a view illustrating a procedure for transferring network function exposure service-related information through an edge enabler layer according to an embodiment of the disclosure.

Referring to FIG. 7, in step 705, the EEC 701 transmits a service request message of the UE to the ECS 702. The service request message of the UE transmitted by the EEC 701 to the ECS 702 may include a serving PLMN ID (identification information about the PLMN currently accessed by the UE). For example, the EEC 701 may include the serving PLMN ID in the service provisioning request message defined in the 3GPP TS 23.558 standard and transmit the same to the ECS 702.

In step 710, the ECS 702 identifies information about the NF (e.g., NEF, SCEF, . . . ) related to network function exposure of the current serving PLMN of the UE or information about the CCF or AEF. According to an embodiment, the ECS 702 may identify subscriber information about the UE in conjunction with the UDM or edge computing service subscriber database server, and may identify whether direct API invocation is allowed or supported. When the direct API invocation is allowed or supported for the corresponding UE or the EEC 701 in the UE, the ECS 702 may provide the communicable NEF information, CCF information, or AEF information to the UE. For example, in response to the service provisioning request message received in step 705, the ECS 702 may include NEF information, CCF information, or AEF information in a service provisioning response message defined in the 3GPP TS 23.558 standard and may transmit the same to the UE. The NEF information, the CCF information, or the AEF information may include at least one of the following information.

- NEF information: NEF ID, NEF endpoint address, NEF service area information, list of service APIs invokable through the NEF, application function (AF) information (e.g., application ID, application function ID, endpoint address, application client ID, etc.) interoperable with the NEF, application service information (e.g., application service name or application provider information) interoperable with the NEF, edge computing service provider information, or information (e.g., direct API invocation or indirect API invocation) about the invocation method allowed for the API provided by the NEF
- CCF information: CCF ID, CCF endpoint address, CCF service area information (e.g., TA, GLC, or DNAI), data network name or network slice information required to generate a PDU session for accessing CCF, CCF provider information (e.g., provider ID), list of service APIs invokable through the CCF, information about the invocation method (e.g., direct API invocation or indirect API invocation) allowed for the API provided by the CCF, information about whether topology hiding is supported for the service API, or serviceable PLMN ID list provided by the CCF
- AEF information: AEF ID, AEF endpoint address, AEF service area information (e.g., TA, GLC, or DNAI), service API list invokable through the AEF, application function information (e.g., application ID, application function ID, endpoint address, application client ID, etc.) interoperable with the corresponding AEF, application service information (e.g., application service name or application provider information) interoperable with the corresponding AEF, data network name or network slice information required to generate a PDU session for accessing the CCF, edge computing service provider information interoperable with the AEF, information about the invocation method (e.g., direct API invocation or indirect API invocation) allowed for the API provided by the AEF, information about whether topology hiking is supported for the service API, or serviceable PLMN ID list provided by the AEF According to an embodiment, the ECS 702 may provide the EEC 701 with whether the local NEF is supported and/or a list of APIs supported by the corresponding NEF or CCF. According to an embodiment, the ECS 702 may provide AF ID information about the ECS 702 to the EEC 701.

In step 715, the EEC 701 transmits a registration request message or an EAS discovery message to the EES 703. The registration request message or the EAS discovery message transmitted by the EEC 701 to the EES 703 may include at least one of a UE ID, a serving PLMN ID, or an AC profile. For example, the EEC 701 may include at least one of the UE ID, the serving PLMN ID, or the AC profile in the EEC registration request message or the EAS discovery request message defined in the 3GPP TS 23.558 standard and may transmit the same to the EEC 703. The AC profile information may include API list information required for the service of the corresponding AC. According to an embodiment, the EES 703 may identify the API list required for the service of the AC included in the AC profile information received from the EEC 701, may determine the NEF, the CCF, or the AEF capable of providing the corresponding APIs, and may provide the corresponding service. According to an embodiment, the EES 703 may identify the serving PLMN ID received from the EEC 701 and may determine which of the NEF information, the CCF information, or the AEF information is to be provided using the identified serving PLMN ID.

In step 720, the EES 703 may select information (NEF information) about the NEF (e.g., the NEF installed in the corresponding PLMN) related to network function exposure of the PLMN matching the serving PLMN ID or AC profile information provided by the EEC 701, information (CCF information) about the CCF, or information (AEF information) about the AEF and provide the same to the UE. According to an embodiment, the EES 703 may identify, through the UDM, whether the EEC 701 does not provide the serving PLMN ID or which PLMN the UE (UE having the EEC 701 installed therein) is currently connected to according to the policy set in the EES and provide information (i.e., one of NEF information, CCF information, or AEF information) about any one of the NEF, CCF, or AEF accessible in the PLMN currently connected by the UE. According to an embodiment, the EES 703 may request the UDM or a separate edge computing service subscriber database server to identify the information about the corresponding subscriber in order to determine whether the direct API invocation is allowed or supported for the corresponding UE or the subscriber using the EEC 701. According to an embodiment, when the EEC 701 provides the AC profile information in step 715, the EES 703 may identify whether network function exposure is supported for the EAS providing the service to the AC. For example, the EES 703 may identify whether the application service provider (ASP)-mobile network operator (MNO) service level agreement (SLA) for the EAS provider ID (ASP ID or EAS provider ID) includes an indicator indicating whether the direct API invocation of the UE is allowed or supported in the core network device (e.g., UDM or UDR) or the edge computing service subscriber database.

In step 725, the EES 703 provides NEF information, CCF information, or AEF information to the EEC 701. For example, the EES 703 may include NEF information, CCF information, or AEF information in an EEC registration response message or an EAS discovery response message defined in the 3GPP TS 23.558 standard in response to the EEC registration request message or the EAS discovery request message of step 715, and may transfer the same to the EEC 701.

According to an embodiment, the NEF information provided by the EES 703 may include the NEF ID, the NEF endpoint address, the list of service APIs invokable through the corresponding NEF, and the indicator indicating whether direct API invocation is allowed or supported for the API provided by the corresponding NEF. When the EES 703 provides NEF information to the EEC 701, the AF ID of the EES 701 may be provided together. The AF ID of the EES 703 may be included in the API invocation message and transmitted to the NEF when the EEC 701 later accesses the NEF and invokes the API. The AF ID of the EES 703 received from the EEC 701 may be used in the NEF to authenticate which AF the service is for and for service purposes. When authentication is intended, the EEC 701 may provide the NEF with the related AF ID and the UE ID together when invoking the service API of the NEF.

According to an embodiment, when the serving PLMN of the UE supports the CAPIF, the EES 703 may select the CCF or the AEF instead of the NEF and may provide the same to the EEC 701. According to another embodiment, the EES 703 may provide the EEC 701 with only AEF information (without providing CCF information, which is information about the CCF) that is information about the AEF providing the service API usable for the EEC 701 or the UE on which the EEC 701 is installed. When providing the CCF information or the AEF information, the EES 703 may include an indicator indicating whether direct API invocation for each of the CCF and the AEF is allowed or supported. The EES 703 may provide the AF ID of the EES 703 together with CCF information or AEF information to the EEC 701.

In step 730, the EEC 701 performs required service API invocation using the NEF information, CCF information, or AEF information received from the EES 703 and the ECS 702. The method of invoking the required service API follows the method specified by the indicator indicating whether direct API invocation is allowed, as received from the EES 703 and ECS 702. When the EEC 701 invokes the service API provided by the NEF, the CCF, or the AEF, the EEC 701 may include the AF ID provided from the EES 703 or the ECS 702 in the service API invocation request message.

Figure 8:
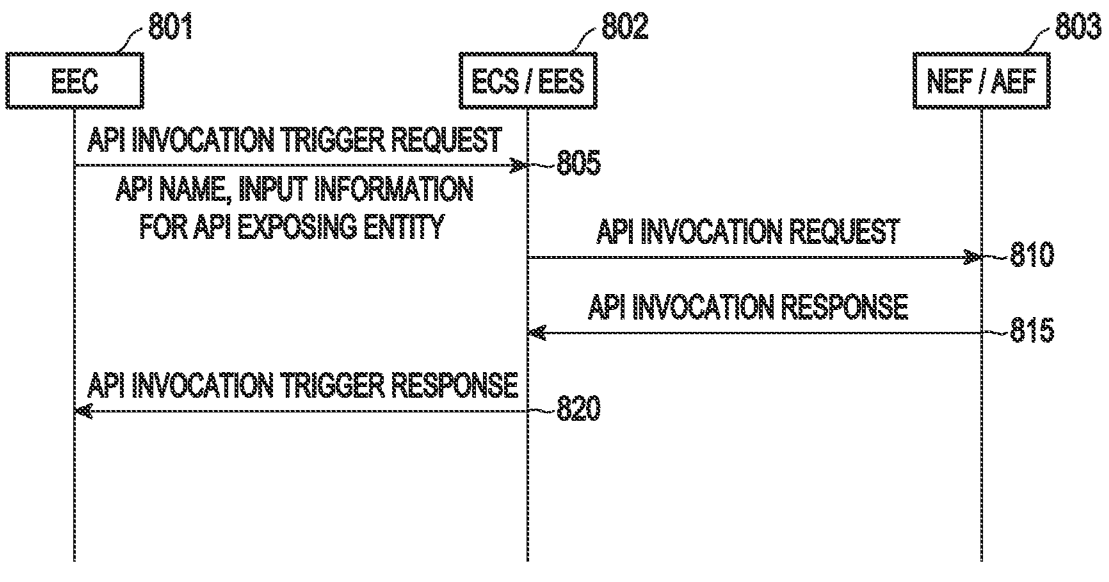
FIG. 8 is a view illustrating an indirect API invocation procedure of an EEC for an NEF or an AEF according to an embodiment of the disclosure.

FIG. 8 is a view illustrating an indirect API invocation procedure of an EEC for an NEF or an AEF according to an embodiment of the disclosure.

Referring to FIG. 8, in step 805, the EEC 801 transmits an API invocation trigger request message to the ECS or the EES 802. The API invocation trigger request message transmitted by the EEC 801 to the ECS or EES 802 may include at least one of the following information.

Request API name, UE ID, ID and address information about NEF or AEF, invocation trigger request indicator, user consent (e.g., consent to provide information necessary to use the API service to external ECS or EES in 3GPP network)

According to an embodiment, instead of transmitting a separate API invocation trigger request message to the ECS or the EES 802, the EEC 801 may include and transmit an invocation trigger request indicator and request target service API information in a request message (e.g., a service provisioning request message, an EAS discovery request message, an application context relocation request message, or the like) of another service provided by the ECS or the EES 802, thereby performing API invocation request.

In step 810, the EES or ECS 802 determines which service API to invoke by communicating with which NEF or AEF using the information in the API invocation trigger request message received from the EEC 801, and performs the service API invocation operation by transmitting the API invocation request message to the selected NEF or AEF 803. According to an embodiment, when the core network interoperating with the EES or ECS 802 supports the local NEF (or local network function exposure), the API invocation request message may be transmitted to the local NEF located close to the EES or ECS 802 in consideration of at least one of the location of the UE, the DNAI of the EES or ECS 802, and the service area of the EES or ECS 802.

In step 815, the NEF or AEF 803 transmits a response message to the API invocation request message received from the ECS or EES 802. The response message transmitted by the NEF or AEF 803 to the ECS or EES 802 may include an API invocation result. According to an embodiment, if the NEF or AEF 803 does not support the corresponding service API, or if another NEF or AEF is more suitable to provide the service API (e.g., when overload occurs or when there is an NEF or AEF present at a closer location), the response message transmitted by the NEF or AEF 803 to the ECS or EES 802 may include the ID and address information about the other NEF or AEF together with the API invocation failure code.

In step 820, the EES or ECS 802 transmits a response message including the result of the API invocation trigger request (the result of the API invocation received from the NEF or AEF 803) to the EEC 801.

Figure 9:
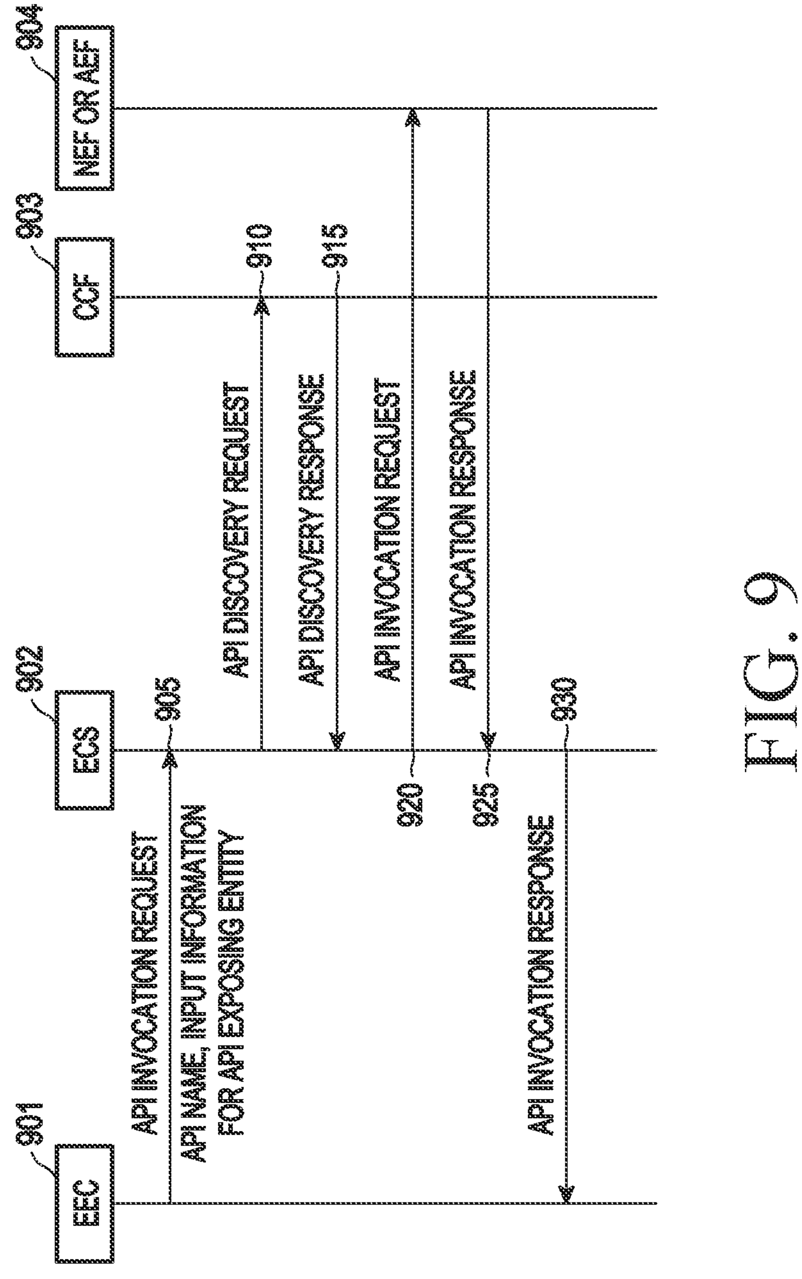
FIG. 9 is a view illustrating an indirect API invocation procedure of an EEC for a CCF according to an embodiment of the disclosure.

FIG. 9 is a view illustrating an indirect API invocation procedure of an EEC for a CCF according to an embodiment of the disclosure.

Referring to FIG. 9, in step 905, the EEC 901 transmits an API invocation trigger request message to the ECS or the EES 802. The API invocation trigger request message transmitted by the EEC 901 to the ECS or EES 902 may include at least one of the following information.

Request API name, UE ID, ID and address information about CCF, NEF or AEF, invocation trigger request indicator, user consent (e.g., consent to provide information necessary to use the API service to external ECS or EES in 3GPP network)

According to an embodiment, instead of transmitting a separate API invocation trigger request message to the ECS or the EES 902, the EEC 901 may include and transmit an invocation trigger request indicator and request target service API information in a request message (e.g., a service provisioning request message, an EAS discovery request message, an application context relocation request message, or the like) of another service provided by the ECS or the EES 902, thereby performing API invocation request.

When the ECS or EES 902 supports interoperation with the CCF 903 in step 910, an API discovery request message is transmitted to the CCF 903. The ECS or EES 902 may transmit an API discovery request message to the CCF 902 to discover the NEF or AEF for the API invocation trigger request of the EEC 901. The API discovery request message transmitted from the ECS or EES 902 to the CCF 903 may include user consent (e.g., consent to provide information necessary to use the corresponding API service to the external ECS or EES in the 3GPP network) provided from the EEC 901.

In step 915, the CCF 903 transmits a response message to the API discovery request message received from the ECS or EES 902 to the ECS or EES 902. The response message transmitted by the CCF 903 to the ECS or EES 902 may include information (e.g., ID and address information about the NEF or AEF) about the NEF or AEF 904 capable of providing the requested service API.

In step 920, the ECS or EES 902 performs a service API invocation operation by transmitting an API invocation request message to the NEF or AEF 903 using the address information about the NEF or AEF 904 included in the response message received from the CCF 903.

In step 925, the NEF or AEF 904 transmits a response message to the API invocation request message received from the ECS or EES 902. The response message transmitted by the NEF or AEF 904 to the ECS or EES 902 may include an API invocation result. According to an embodiment, if the NEF or AEF 904 does not support the corresponding service API, or if another NEF or AEF is more suitable to provide the service API (e.g., when overload occurs or when there is an NEF or AEF present at a closer location), the response message transmitted by the NEF or AEF 904 to the ECS or EES 902 may include the ID and address information about the other NEF or AEF together with the API invocation failure code.

In step 930, the EES or ECS 902 transmits a response message including the result of the API invocation trigger request (the result of the API invocation received from the NEF or AEF 904) to the EEC 901.

Figure 10:
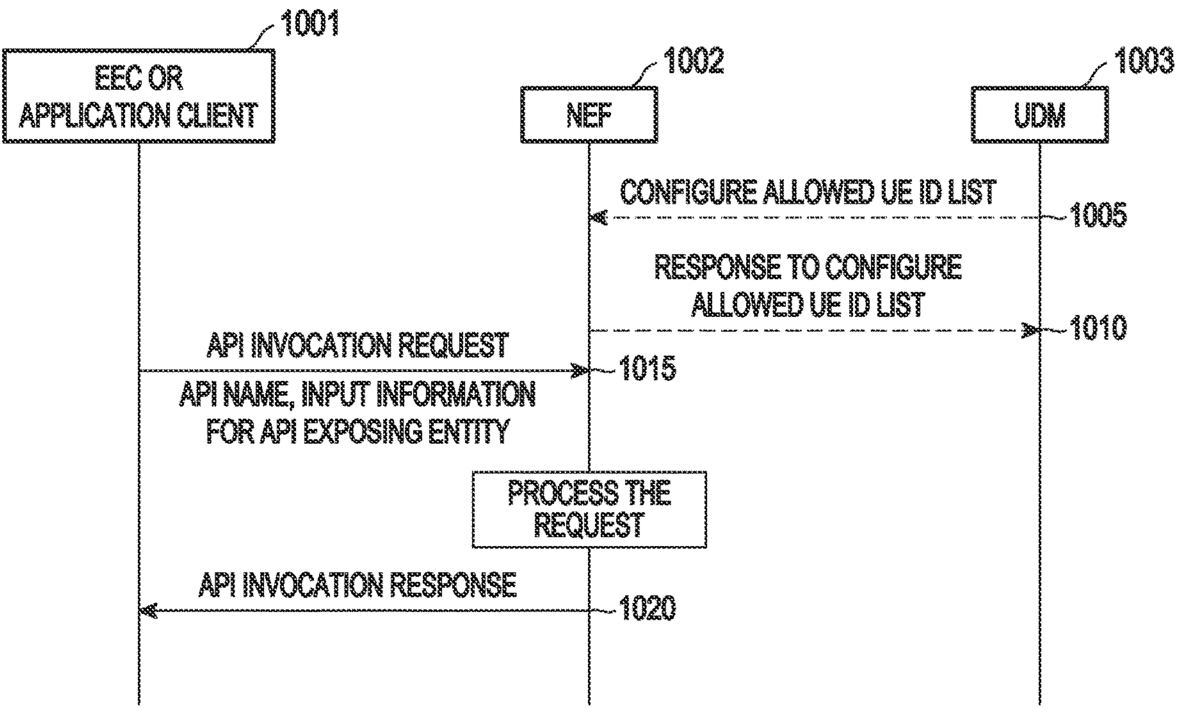
FIG. 10 is a view illustrating an API invocation procedure of an EEC for an NEF according to an embodiment of the disclosure.

FIG. 10 is a view illustrating an API invocation procedure of an EEC for an NEF according to an embodiment of the disclosure.

Referring to FIG. 10, in step 1005, the UDM 1003 provides information (e.g., a UE ID or a UE group ID such as a mobile station integrated services digital network (ISDN) number definition (MSISDN) or a generic public subscription identifier (GPSI)) about the UE for which direct API invocation is allowed (or supported), to the NEF 1002. According to an embodiment, the information about the UE may be provided together with the AF ID of the application server providing the service to the corresponding UE. According to an embodiment, the UDM 1003 may directly provide the NEF 1002 with information about the application client or the EEC 1001 for which direct API invocation is allowed. For example, the UDM 1003 may provide the application client ID or the EEC ID together with the UE ID to the NEF 1002. In this case, it indicates that direct API invocation is allowed only for a specific application client or EEC in the UE. According to an embodiment, the UDM 1003 may select the NEF 1002 capable of providing service at the location of the UE and provide a UE ID list or UE group ID list for UEs for which direct API invocation is allowed. According to an embodiment, the UDM 1003 may perform subscription for receiving a notification when a related event (e.g., NEF access by the UE) occurs while simultaneously providing information about the UE for which direct API invocation is allowed (or supported) to the NEF 1002. According to an embodiment, the UDM 1001 may provide the NEF 1002 with a list of service APIs that the UE subscriber or the user consents to use or information externally sharable, along with the information about the UE when providing the information about the UE for which direct API invocation is allowed (or supported).

In step 1010, the NEF 1002 transmits, to the UDM 1003, a response message including an indicator indicating whether reception and storage of the information about the UE for which direct API invocation is allowed (or supported) is successful.

In step 1015, the client (e.g., the EEC or the application client) 1001 in the UE transmits an API invocation request message to the NEF 1002. The API invocation request message transmitted from the client 1001 in the UE to the NEF 1002 may include at least one of the following information.

Name of API to be invoked, input value required to use API service to be invoked, AF information (e.g., address information and AF ID of ECS, EES, or EAS) linked to API service to be invoked, UE ID, ID of invoking client (EEC ID or application client ID), user consent (e.g., consent to provide information required to use the API service to the AF or external server such as external ECS or EES in 3GPP network)

According to an embodiment, when at least one of the following conditions is met, the client 1001 in the UE (EEC or application client) may transmit an API invocation request message to the NEF 1002.

(1) Completion of installation of application client in UE, (2) Application client in UE requests service from EEC, (3) When application client is executed, (4) When application client is executed, generating and transmitting traffic toward application server, (5) When service quality degrades while application client receives service from application server, (6) When UE-related information needs to be received from 3GPP core network According to an embodiment, the NEF 1002 interoperates with the network function of the associated core network according to the API invocation request message received from the client (EEC or application client) 1001 in the UE. According to an embodiment, when steps 1005 and 1010 are not performed, the NEF 1002 may interoperate with the UDM to authenticate the UE that has transmitted the API invocation request message to the NEF 1002. For example, the NEF 1002 may provide the ID for the corresponding UE to the UDM while identifying whether direct API invocation is allowed (or supported) for the UE. According to an embodiment, when receiving a report that direct API invocation is not allowed (or supported) for the UE or there is no related subscriber information from the UDM, the NEF 1002 rejects the API invocation request of the UE.

In step 1020, the NEF 1002 transmits a response message including the result of the API invocation request to the client (EEC or application client) 1001 in the UE.

After successfully completing the service API invocation request according to the embodiments of FIGS. 8, 9, and 10, the client (EEC or application client) in the UE may request to stop using the corresponding service API. For example, the client in the UE may transmit a message requesting to stop or cancel the use of the service API to the device that has transmitted the API invocation request message. The message requesting to stop or cancel the use of the service API may include information such as the target API name, information (e.g., address information and AF ID of the ECS, EES, or EAS) about the AF desired to be stopped from use among the Afs using the API service to be invoked, or UE ID and/or UE group ID. Additionally, even when the client in the UE does not perform the service API invocation request as shown in FIGS. 8, 9, and 10, but wants to stop using the service API for the corresponding UE that is currently invoked from the external AF and used, the client in the UE may likewise perform the operation of requesting to stop or cancel the use of the specific service API.

Figure 11:
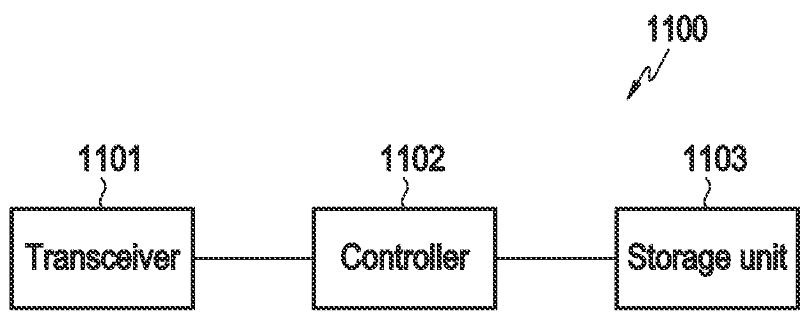
FIG. 11 is a view illustrating a configuration of a UE according to an embodiment of the disclosure.

FIG. 11 is a view illustrating a configuration of a UE according to an embodiment of the present invention.

Referring to FIG. 11, a UE 1100 communicating with a base station or another network entity in a wireless communication system may include a transceiver 1101, a controller 1102, and a storage unit 1103. The controller 1102 may be defined as a circuit or application-specific integrated circuit or at least one processor.

The transceiver 1101 may transmit and receive signals to/from the base station or the other network entity. For example, the transceiver 1101 may transmit an API invocation trigger request message to the ECS or EES according to the above-described embodiments.

The controller 1102 may control the overall operation of the UE according to various embodiments proposed in the disclosure. For example, the controller 1102 may control the signal flow between blocks to perform the operations according to the procedures described above in connection with FIGS. 3 to 10. For example, the controller 1102 may control the overall operation related to specific service API invocation according to the above-described embodiments.

The storage unit 1103 may store at least one of information transmitted/received via the transceiver 1101 and information generated via the controller 1102. For example, the storage unit 1103 may store, e.g., results of an API invocation trigger request according to the above-described embodiments.

Figure 12:
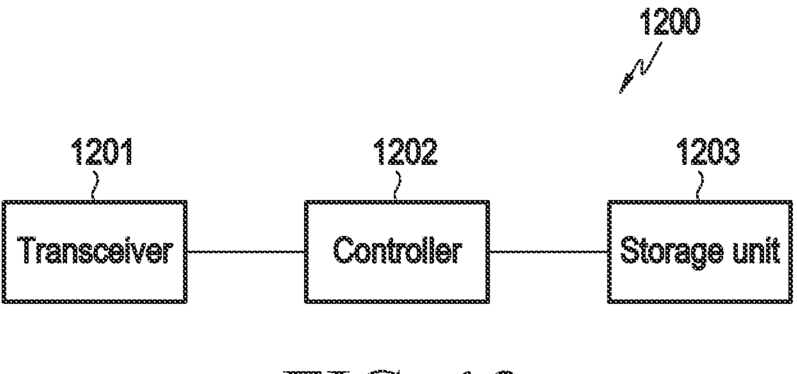
FIG. 12 is a view illustrating a configuration of a network entity according to an embodiment of the disclosure.

FIG. 12 is a view illustrating a configuration of a network entity according to an embodiment of the disclosure.

The network entity of FIG. 12 may include, e.g., an ECS, an NEF, a CCF, and an AEF.

Referring to FIG. 12, the network entity 1200 communicating with another entity or UE in the wireless communication system may include a transceiver 1201, a controller 1202, and a storage unit 1203. The controller 1202 may be defined as a circuit or application-specific integrated circuit or at least one processor.

The transceiver 1201 may transmit/receive a signal to/from another network entity or UE. For example, the transceiver 1201 may receive an API invocation request from the client (EEC or application client) in the UE or may transmit the above-described API invocation-related information to the UE.

The controller 1202 may control the overall operation of the network entity 1200 according to embodiments proposed in the disclosure. For example, the controller 1202 may control the signal flow between blocks to perform the operations according to the procedures described above in connection with FIGS. 3 to 10. For example, the controller 1202 may control the operations proposed in the disclosure to generate API invocation-related information according to the above-described embodiments.

The storage unit 1203 may store at least one of information transmitted/received via the transceiver 1201 and information generated via the controller 1202. For example, the storage unit 1203 may store the above-described API invocation-related information according to the above-described embodiments.

A method performed by a user equipment (UE) in a wireless communication system according to an embodiment of the disclosure may comprise transmitting a first request message including information about an application program interface (API) invocation capability of the UE to a network entity, receiving a first response message including information related to whether API invocation is allowed from the network entity in response to the first request message, and invoking the API based on the information related to whether the API invocation is allowed.

According to an embodiment, the information about the application program interface invocation capability of the UE may include at least one of: an indicator indicating that the UE has the API invocation capability; information about whether a client for performing the API invocation is installed; information about a type of the client; and information about whether a modem in the UE may interoperate with the client.

According to an embodiment, the first request message may further include consent to sharing information related to the UE with an outside in a network.

According to an embodiment, the information related to whether the API invocation is allowed may include at least one of network exposure function (NEF) information, common API framework (CAPIF) core function (CCF) information, and API exposing function (AEF) information.

According to an embodiment, the NEF information may include at least one of an NEF identifier (ID), an NEF endpoint address, NEF service area information, a service API list invokable through the NEF, information about an application function (AF) interoperable with the NEF, information about an application service interoperable with the NEF, edge computing service provider information, or information about an invocation method allowed for an API provided by the NEF.

According to an embodiment, the CCF information may include at least one of a CCF identifier (ID), a CCF endpoint address, CCF service area information, data network name or network slice information (single-network slice selection assistance information (S-NSSAI) required to generate a PDU session for accessing the CCF, a service API list invokable through the CCF, information about an invocation method allowed for an API provided by the CCF, information about whether topology hiding is supported for the API, or a serviceable PLMN ID list provided by the CCF.

According to an embodiment, the AEF information may include at least one of an AEF identifier (ID), an AEF endpoint address, AEF service area information, an invokable service API list, information about an application function interoperable with the AEF, information about an application service interoperable with the AEF, data network name or network slice information required to generate a PDU session for accessing the AEF, edge computing service provider information interoperable with the AEF, information about an invocation method allowed for an API provided by the AEF, information about whether topology hiding is supported for the API, or a serviceable PLMN ID list provided by the AEF.

A method performed by a network entity in a wireless communication system according to an embodiment of the disclosure may comprise receiving a first request message including information about an application program interface (API) invocation capability of a user equipment (UE) from the UE, determining whether the UE has an authority for API invocation based on the information about the application program interface (API) invocation capability of the UE, and transmitting a first response message including information related to whether API invocation is allowed to the UE in response to the first request message.

In the disclosure, the application client and the EEC, as mentioned as an entity for directly/indirectly performing service API invocation as a client in the UE, have been described. However, operations of an enabler client for a specific service (e.g., service enabler architecture layer client or unmanned aerial system application enabler client) or all other application modules in the UE other than the EEC and the application client may also be included in the scope of the disclosure.

The above-described operations of the base station or terminal may be realized by equipping a memory device retaining their corresponding codes in the base station device or any component of the terminal device. That is, the controller in the eNB or terminal may execute the above-described operations by reading and executing the program codes stored in the memory device by a processor or central processing unit (CPU).

As described herein, various components or modules in the entity, base station or UE may be operated using a hardware circuit, e.g., a complementary metal oxide semiconductor-based logic circuit, firmware, software, and/or using a hardware circuit such as a combination of hardware, firmware, and/or software embedded in a machine-readable medium. As an example, various electric structures and methods may be executed using electric circuits such as transistors, logic gates, or ASICs.

Although specific embodiments of the present disclosure have been described above, various changes may be made thereto without departing from the scope of the present disclosure. Thus, the scope of the present invention should not be limited to the above-described embodiments, and should rather be defined by the following claims and equivalents thereof.

The invention claimed is:

1. A method performed by a user equipment (UE) in a wireless communication system, the method comprising:

transmitting, to a network entity, a first request message including information about an application program interface (API) invocation capability of the UE;

receiving, from the network entity, a first response message including information related to whether API invocation is allowed in response to the first request message; and invoking the API based on the information related to whether the API invocation is allowed.

2. The method of claim 1, wherein the information about the API invocation capability of the UE includes at least one of:

an indicator indicating that the UE has the API invocation capability;

information about whether a client for performing the API invocation is installed;

information about a type of the client; and information about whether a modem in the UE is interoperable with the client.

3. The method of claim 1, wherein the first request message further includes consent to sharing information related to the UE with an outside in a network.

4. The method of claim 1, wherein the information related to whether the API invocation is allowed includes at least one of network exposure function (NEF) information, common API framework (CAPIF) core function (CCF) information, and API exposing function (AEF) information.

5. The method of claim 4, wherein the NEF information includes at least one of:

an NEF identifier (ID), an NEF endpoint address, NEF service area information, a service API list invokable through the NEF, information about an application function (AF) interoperable with the NEF, information about an application service interoperable with the NEF, edge computing service provider information, or information about an invocation method allowed for an API provided by the NEF.

6. The method of claim 4, wherein the CCF information includes at least one of:

a CCF identifier (ID), a CCF endpoint address, CCF service area information, data network name or network slice information (single-network slice selection assistance information (S-NSSAI) required to generate a protocol data unit (PDU) session for accessing the CCF, a service API list invokable through the CCF, information about an invocation method allowed for an API provided by the CCF, information about whether topology hiding is supported for the API, or a serviceable public land mobile network (PLMN) ID list provided by the CCF.

7. The method of claim 4, wherein the AEF information includes at least one of:

an AEF identifier (ID), an AEF endpoint address, AEF service area information, an invokable service API list, information about an application function interoperable with the AEF, information about an application service interoperable with the AEF, data network name or network slice information required to generate a protocol data unit (PDU) session for accessing the AEF, edge computing service provider information interoperable with the AEF, information about an invocation method allowed for an API provided by the AEF, information about whether topology hiding is supported for the API, or a serviceable public land mobile network (PLMN) ID list provided by the AEF.

8. A method performed by a network entity in a wireless communication system, the method comprising:

receiving, from a user equipment (UE), a first request message including information about an application program interface (API) invocation capability of the UE;

determining whether the UE has an authority for API invocation based on the information about the API invocation capability of the UE; and transmitting, to the UE, a first response message including information related to whether API invocation is allowed in response to the first request message.

9. The method of claim 8, wherein the information about the API invocation capability of the UE includes at least one of:

an indicator indicating that the UE has the API invocation capability;

information about whether a client for performing the API invocation is installed;

information about a type of the client; and information about whether a modem in the UE is interoperable with the client.

10. The method of claim 8, wherein the information related to whether the API invocation is allowed includes at least one of network exposure function (NEF) information, common API framework (CAPIF) core function (CCF) information, and API exposing function (AEF) information.

11. The method of claim 10, wherein the NEF information includes at least one of: an NEF identifier (ID), an NEF endpoint address, NEF service area information, a service API list invokable through the NEF, information about an application function (AF) interoperable with the NEF, information about an application service interoperable with the NEF, edge computing service provider information, or information about an invocation method allowed for an API provided by the NEF, wherein the CCF information includes at least one of a CCF ID, a CCF endpoint address, CCF service area information, data network name or network slice information (single-network slice selection assistance information (S-NSSAI) required to generate a protocol data unit (PDU) session for accessing the CCF, a service API list invokable through the CCF, information about an invocation method allowed for an API provided by the CCF, information about whether topology hiding is supported for the API, or a serviceable public land mobile network (PLMN) ID list provided by the CCF, and wherein the AEF information includes at least one of an AEF ID, an AEF endpoint address, AEF service area information, an invokable service API list, information about an application function interoperable with the AEF, information about an application service interoperable with the AEF, data network name or network slice information required to generate a PDU session for accessing the AEF, edge computing service provider information interoperable with the AEF, information about an invocation method allowed for an API provided by the AEF, information about whether topology hiding is supported for the API, or a serviceable PLMN ID list provided by the AEF.

12. A user equipment (UE) in a wireless communication system, comprising:

a transceiver; and at least one processor, wherein the at least one processor is configured to:

transmit, to a network entity, a first request message including information about an application program interface (API) invocation capability of the UE;

receive, from the network entity, a first response message including information related to whether API invocation is allowed in response to the first request message; and invoke the API based on the information related to whether the API invocation is allowed.

13. The UE of claim 12, wherein the information about the API invocation capability of the UE includes at least one of:

an indicator indicating that the UE has the API invocation capability;

information about whether a client for performing the API invocation is installed;

information about a type of the client; and information about whether a modem in the UE is interoperable with the client.

14. The UE of claim 12, wherein the first request message further includes consent to sharing information related to the UE with an outside in a network.

15. The UE of claim 12, wherein the information related to whether the API invocation is allowed includes at least one of network exposure function (NEF) information, common API framework (CAPIF) core function (CCF) information, and API exposing function (AEF) information.

16. The UE of claim 15, wherein the NEF information includes at least one of an NEF identifier (ID), an NEF endpoint address, NEF service area information, a service API list invokable through the NEF, information about an application function (AF) interoperable with the NEF, information about an application service interoperable with the NEF, edge computing service provider information, or information about an invocation method allowed for an API provided by the NEF, wherein the CCF information includes at least one of a CCF ID, a CCF endpoint address, CCF service area information, data network name or network slice information (single-network slice selection assistance information (S-NSSAI) required to generate a protocol data unit (PDU) session for accessing the CCF, a service API list invokable through the CCF, information about an invocation method allowed for an API provided by the CCF, information about whether topology hiding is supported for the API, or a serviceable public land mobile network (PLMN) ID list provided by the CCF, and wherein the AEF information includes at least one of an AEF ID, an AEF endpoint address, AEF service area information, an invokable service API list, information about an application function interoperable with the AEF, information about an application service interoperable with the AEF, data network name or network slice information required to generate a PDU session for accessing the AEF, edge computing service provider information interoperable with the AEF, information about an invocation method allowed for an API provided by the AEF, information about whether topology hiding is supported for the API, or a serviceable PLMN ID list provided by the AEF.

17. A network entity in a wireless communication system, comprising:

a transceiver; and at least one processor, wherein the at least one processor is configured to:

receive, from a user equipment (UE), a first request message including information about an application program interface (API) invocation capability of the UE;

determine whether the UE has an authority for API invocation based on the information about the API invocation capability of the UE; and transmit, to the UE, a first response message including information related to whether API invocation is allowed in response to the first request message.

18. The network entity of claim 17, wherein the information about the API invocation capability of the UE includes at least one of:

an indicator indicating that the UE has the API invocation capability;

information about whether a client for performing the API invocation is installed;

information about a type of the client; and information about whether a modem in the UE is interoperable with the client.

19. The network entity of claim 17, wherein the information related to whether the API invocation is allowed includes at least one of network exposure function (NEF) information, common API framework (CAPIF) core function (CCF) information, and API exposing function (AEF) information.

20. The network entity of claim 19, wherein the NEF information includes at least one of an NEF identifier (ID), an NEF endpoint address, NEF service area information, a service API list invokable through the NEF, information about an application function (AF) interoperable with the NEF, information about an application service interoperable with the NEF, edge computing service provider information, or information about an invocation method allowed for an API provided by the NEF, wherein the CCF information includes at least one of: a CCF ID, a CCF endpoint address, CCF service area information, data network name or network slice information (single-network slice selection assistance information (S-NSSAI) required to generate a protocol data unit (PDU) session for accessing the CCF, a service API list invokable through the CCF, information about an invocation method allowed for an API provided by the CCF, information about whether topology hiding is supported for the API, or a serviceable public land mobile network (PLMN) ID list provided by the CCF, and wherein the AEF information includes at least one of an AEF ID, an AEF endpoint address, AEF service area information, an invokable service API list, information about an application function interoperable with the AEF, information about an application service interoperable with the AEF, data network name or network slice information required to generate a PDU session for accessing the AEF, edge computing service provider information interoperable with the AEF, information about an invocation method allowed for an API provided by the AEF, information about whether topology hiding is supported for the API, or a serviceable PLMN ID list provided by the AEF.

* * * * *